(12) United States Patent
Quirk et al.

(10) Patent No.: US 11,250,331 B2
(45) Date of Patent: Feb. 15, 2022

(54) DISTANT SUPERVISION FOR ENTITY LINKING WITH FILTERING OF NOISE

(71) Applicant: Microsoft Technology Licensing, LLC, Redmond, WA (US)

(72) Inventors: Christopher Brian Quirk, Seattle, WA (US); Hoifung Poon, Bellevue, WA (US); Wen-tau Yih, Woodinville, WA (US); Hai Wang, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1080 days.

(21) Appl. No.: 15/800,005

(22) Filed: Oct. 31, 2017

(65) Prior Publication Data

US 2019/0130282 A1     May 2, 2019

(51) Int. Cl.
*G06N 5/02*     (2006.01)
*G06N 3/08*     (2006.01)
(Continued)

(52) U.S. Cl.
CPC .............. *G06N 5/02* (2013.01); *G06F 16/22* (2019.01); *G06F 16/243* (2019.01);
(Continued)

(58) Field of Classification Search
CPC ...... G06F 16/22; G06F 16/242; G06F 16/243; G06F 16/00; G06F 17/27; G06F 40/295;
(Continued)

(56) References Cited

U.S. PATENT DOCUMENTS

2013/0246046 A1*  9/2013  Fan ................... G06F 40/30
                                                                   704/9
2013/0268534 A1* 10/2013  Mathew .............. G06F 16/35
                                                                   707/740
(Continued)

OTHER PUBLICATIONS

Bing, Lidong, et al. "Improving distant supervision for information extraction using label propagation through lists." Proceedings of the 2015 Conference on Empirical Methods in Natural Language Processing. 2015 (Year: 2015).*

(Continued)

*Primary Examiner* — Kamran Afshar
*Assistant Examiner* — Randall K. Baldwin

(57) ABSTRACT

A technique is described herein for processing documents in a time-efficient and accurate manner. In a training phase, the technique generates a set of initial training examples by associating entity mentions in a text corpus with corresponding entity identifiers. Each entity identifier uniquely identifies an entity in a particular ontology. The technique then removes noisy training examples from the set of initial training examples, to provide a set of filtered training examples. The technique then applies a machine-learning process to generate a linking component based, in part, on the set of filtered training examples. In an application phase, the technique uses the linking component to link input entity mentions with corresponding entity identifiers. Various application systems can leverage the capabilities of the linking component, including a search system, a document-creation system, etc.

20 Claims, 14 Drawing Sheets

(51) Int. Cl.
G06N 3/04 (2006.01)
G06F 16/22 (2019.01)
G06F 16/242 (2019.01)
G06F 40/30 (2020.01)
G06F 40/295 (2020.01)

(52) U.S. Cl.
CPC ............ *G06F 40/295* (2020.01); *G06F 40/30* (2020.01); *G06N 3/0445* (2013.01); *G06N 3/0454* (2013.01); *G06N 3/08* (2013.01); *G06N 5/022* (2013.01)

(58) Field of Classification Search
CPC .......... G06F 40/30; G06N 5/02; G06N 5/022; G06N 3/0445; G06N 3/0454; G06N 3/08
See application file for complete search history.

(56) References Cited

U.S. PATENT DOCUMENTS

| | | | |
|---|---|---|---|
| 2015/0074027 | A1 | 3/2015 | Huang et al. |
| 2015/0278200 | A1 | 10/2015 | He et al. |
| 2015/0370782 | A1* | 12/2015 | Fan ...................... G06F 40/211 704/9 |
| 2016/0275073 | A1* | 9/2016 | Poon ...................... G06F 40/30 |
| 2017/0337268 | A1* | 11/2017 | Ait-Mokhtar ......... G06F 16/367 |
| 2020/0089692 | A1* | 3/2020 | Tripathi ................. G06F 16/29 |

OTHER PUBLICATIONS

Augenstein, Isabelle. Web Relation Extraction with Distant Supervision. Diss. University of Sheffield, 2016: i-150. (Year: 2016).*

Krause, Sebastian, et al. "Sar-graphs: A language resource connecting linguistic knowledge with semantic relations from knowledge graphs." Journal of Web Semantics 37 (2016): 112-131. (Year: 2016).*

Fries, et al. "Swellshark: A generative model for biomedical named entity recognition without labeled data." arXiv preprint arXiv:1704.06360 (Apr. 20, 2017) (Year: 2017).*

Nadeau, David. Semi-supervised named entity recognition: learning to recognize 100 entity types with little supervision. Diss. University of Ottawa, 2007: i-142 (Year: 2007).*

Zouaq, Amal, Dragan Gasevic, and Marek Hatala. "Towards open ontology learning and filtering." Information Systems 36.7 (2011): 1064-1081. (Year: 2011).*

Bock, Jürgen, Uta Lösch, and Hai Wang. "Automatic reasoner selection using machine learning." Proceedings of the 2nd International Conference on Web Intelligence, Mining and Semantics. 2012: 1-12 (Year: 2012).*

Lowe, Daniel M., and Roger A. Sayle. "LeadMine: a grammar and dictionary driven approach to entity recognition." Journal of cheminformatics 7.1 (2015): 1-9. (Year: 2015).*

Hori, Takaaki, et al. "Dialog state tracking with attention-based sequence-to-sequence learning." 2016 IEEE Spoken Language Technology Workshop (SLT). IEEE, 2016: 552-558 (Year: 2016).*

Lockard, Colin, et al. "CERES: distantly supervised relation extraction from the semi-structured web." arXiv preprint arXiv: 1804.04635 (Apr. 12, 2018): 1-14 (Year: 2018).*

Savova, et al., "Mayo clinical Text Analysis and Knowledge Extraction System (cTAKES): architecture, component evaluation and applications," in J Am Med Inform Assoc, vol. 17, 2010, 7 pages.

Leaman, et al., "DNorm: disease name normalization with pairwise learning to rank," in Bioinformatics, vol. 29, No. 22 2013, 9 pages.

Lu, et al., "The gene normalization task in BioCreative III," in BMC Bioinformatics, vol. 12, 2011, 19 pages.

Craven, et al., "Constructing Biological Knowledge Bases by Extracting Information from Text Sources," in Proceedings of the 7th International Conference on Intelligent Systems for Molecular Biology, AAAI Press, 1999, 10 pages.

Mintz, et al., "Distant supervision for relation extraction without labeled data," in Proceedings of the Forty Seventh Annual Meeting of the Association for Computational Linguistics, 2009, 9 pages.

Poon, et al., "Distant Supervision for Cancer Pathway Extraction From Text," in Proceedings of Pacic Symposium on Biocomputing, 2015, 12 pages.

Quirk, et al., Distant supervision for Relation Extraction beyond the Sentence Boundary, in arXiv:1609.04873v3 [cs.CL], Aug. 14, 2017, 12 pages.

Peng, et al., "Cross-Sentence N-ary Relation Extraction with Graph LSTMs," in arXiv:1708.03743v1 [cs.CL], Aug. 12, 2017, 2017, 15 pages.

Schaefer, et al., "PID: the Pathway Interaction Database," in Nucleic Acids Research, 2009, vol. 37, 2008, 6 pages.

Sil, et al, "Linking Named Entities to Any Database," in Proceedings of the 2012 Joint Conference on Empirical Methods in Natural Language Processing and Computational Natural Language Learning, 2012, 12 pages.

Fan, et al, "Distant Supervision for Entity Linking," in Proceedings of the 29th Pacic Asia Conference on Language, Information and Computation, 2015, 8 pages.

Zhang, et al., "Unsupervised Biomedical Named Entity Recognition: Experiments with Clinical and Biological Texts," in Journal of Biomedical Informatics, vol. 46, No. 6, 2013, 29 pages.

Simon, et al., "Named Entity Recognition in Swedish Health Records with Character-Based Deep Bidirectional LSTMs," in Proceedings of the Fifth Workshop on Building and Evaluating Resources for Biomedical Text Mining, Dec. 2016, 10 pages.

Pyysalo, et al., "Distributional Semantics Resources for Biomedical Text Processing," in Proceedings of LBM, 2013, 5 pages.

Mikolov, et al., "Efficient Estimation of Word Representations in Vector Space," in arXiv:1301.3781v3 [cs.CL], Sep. 7, 2013, 12 pages.

PCT Search and Written Opinion for PCT Application No. PCT/US2018/057194, dated Jan. 30, 2019, 18 pages.

Augenstein, Isabelle, "Web Relation Extraction with Distant Supervision," available at <<http://etheses.whiterose.ac.uk/13247/2/phdthesis.pdf>>, PhD Thesis, University of Sheffield, Sheffield, England, Jul. 2016, 164 pages.

Fries, et al., "SWELLSHARK: A Generative Model for Biomedical Named Entity Recognition without Labeled Data," arXiv:1704.06360v1 [cs.CL], Apr. 20, 2017, 11 pages.

Krause, et al., "Sar-graphs: A language resource connecting linguistic knowledge with semantic relations from knowledge graphs," in Journal of Web Semantics, vol. Nos. 37-38, Mar. 2016, pp. 112-131.

Poon, et al., "Machine Reading for Precision Medicine," available at https://www.microsoft.com/en-us/research/uploads/prod/2018/01/1802_aaai-tutorial_precision-med.pdf, presentation at the Thirty-Second AAAI Conference on Artificial Intelligence (AAAI-18), Feb. 2018, 255 pages.

* cited by examiner

OVERVIEW OF OPERATION OF THE SYSTEM
1102

GENERATE A SET OF INITIAL TRAINING EXAMPLES BY MATCHING CORPUS TERMS IN A TEXT CORPUS WITH REFERENCE TERMS SPECIFIED IN ONE OR MORE ONTOLOGIES, EACH INITIAL TRAINING EXAMPLE IDENTIFYING: AN ENTITY MENTION, CORRESPONDING TO A CORPUS TERM THAT MATCHES AN ASSOCIATED REFERENCE TERM IN AN ONTOLOGY; AN ENTITY IDENTIFIER ASSOCIATED WITH THE ENTITY MENTION WHICH UNIQUELY IDENTIFIES A PARTICULAR ENTITY IN THE ONTOLOGY; AND A TEXTUAL CONTEXT IN WHICH THE ENTITY MENTION APPEARS IN THE TEXT CORPUS
1104

REMOVE NOISE IN THE SET OF INITIAL TRAINING EXAMPLES BY DISCOUNTING INITIAL TRAINING EXAMPLES BASED ON ONE OR MORE FILTERING RULES STORED IN A DATA STORE, TO PRODUCE A SET OF FILTERED TRAINING EXAMPLES
1106

TRAIN A LINKING COMPONENT USING A COMPUTER-IMPLEMENTED MACHINE-LEARNING PROCESS, BASED, IN PART, ON THE SET OF FILTERED TRAINING EXAMPLES
1108

TRANSFER THE LINKING COMPONENT TO AN APPLICATION FRAMEWORK FOR USE WITHIN THE APPLICATION FRAMEWORK
1110

APPLICATION PHASE

RECEIVE AN INPUT ENTITY MENTION
1112

USE THE LINKING COMPONENT TO MAP THE INPUT ENTITY MENTION TO A CORRESPONDING ENTITY IDENTIFIER, THE CORRESPONDING ENTITY IDENTIFIER UNIQUELY IDENTIFYING A PARTICULAR ENTITY IN AN ONTOLOGY
1114

FIG. 11

OVERVIEW OF OPERATION OF THE SEARCH SYSTEM
1202

RECEIVE AN INPUT ITEM AND AT LEAST ONE ORIGINAL CANDIDATE DOCUMENT, EACH ORIGINAL CANDIDATE DOCUMENT INCLUDING ZERO, ONE, OR MORE ENTITY MENTIONS
1204

USE THE LINKING COMPONENT TO MAP EACH ENTITY MENTION IN THE ORIGINAL CANDIDATE DOCUMENT(S) TO A CORRESPONDING ENTITY IDENTIFIER, TO PRODUCE AT LEAST ONE ENTITY-MAPPED CANDIDATE DOCUMENT
1206

COMPARE THE INPUT ITEM WITH THE ENTITY-MAPPED CANDIDATE DOCUMENT(S), TO PROVIDE A MATCH RESULT
1208

PROVIDE THE MATCH RESULT TO A USER
1210

FIG. 12

OVERVIEW OF OPERATION OF THE DOCUMENT CREATION SYSTEM
1302

RECEIVE AN INPUT ITEM FROM THE USER, IN A COURSE OF A CREATING A NEW DOCUMENT BY THE USER
1304

USE THE LINKING COMPONENT TO MAP EACH ENTITY MENTION IN THE INPUT ITEM TO AT A CORRESPONDING ENTITY IDENTIFIER, TO PRODUCE AN ENTITY-MAPPED INPUT ITEM
1306

OPTIONALLY REPLACE EACH ENTITY MENTION WITH A CANONICAL TERM ASSOCIATED WITH THAT ENTITY MENTION'S ENTITY IDENTIFIER
1308

FIG. 13

DISTANT SUPERVISION FOR ENTITY LINKING WITH FILTERING OF NOISE

BACKGROUND

The information revolution offers the promise of facilitating various information-intensive tasks. For instance, the abundance of publically available medical information offers the potential of improving the ability of healthcare providers to provide effective care to their patients. This is particularly true in the field of precision medicine. In that setting, a healthcare provider attempts to deliver treatment to a patient that is fine-tuned to unique characteristics of the patient, including the patient's pathology.

Yet it has proven difficult to place relevant information in the hands of a professional on a timely basis. Different factors contribute to this problem. For instance, a medical-related document may refer to a concept (e.g., a disease, gene, etc.) using many different reference terms. This factor makes it difficult to find and/or cluster relevant documents in a timely manner. For instance, a provider may attempt to find information regarding a gene using a first reference term, while the most relevant document uses a different reference term to describe the gene.

Some systems address this problem using dictionary-based lookup techniques. Other systems use classification models that have been trained based on a corpus of manually-annotated data. Dictionary-based solutions are not always successful in interpreting the sometimes-ambiguous terms in medical-related documents, e.g., due to the great variety of ways in which terms can be expressed. The machine-learning-based solutions are not fully satisfactory because they require the time-consuming task of labeling training examples. Still other machine-learning solutions presuppose the availability of descriptive Wikipedia-type information regarding ambiguous terms; but that information is not always available on a suitably fine-grained level.

While the above problems have been framed in the illustrative context of healthcare-related systems, other fields and associated systems suffer from the same issues.

SUMMARY

A technique is described herein for processing documents in a time-efficient and accurate manner. In a training phase, the technique generates a set of initial training examples by associating entity mentions in a text corpus with corresponding entity identifiers. Each entity identifier uniquely identifies an entity in a particular ontology, e.g., by specifying a canonical term or other ID associated with the entity. The technique then removes noisy training examples from the set of initial training examples, to provide a set of filtered training examples. The technique then applies a machine-learning process to generate a linking component based, in part, on the set of filtered training examples.

In an application phase, the technique uses the linking component to link input entity mentions with corresponding entity identifiers. Various application systems can leverage the capabilities of the linking component, including a search system, a document-creation system, etc. For example, in the medical field, the technique can use the linking component to quickly and accurately match a patient's electronic medical record with one or more documents describing clinical trials that are appropriate for the patient. This ability enables a healthcare provider to identify and act on pertinent information in a timely manner, which may contribute the provider's goal of improving healthcare outcomes.

The technique has various other technical merits beyond its speed and accuracy. For example, the technique can generate the linking component without the use of manually annotated training examples, and without the use of extrinsic information regarding the entities that it identifies (beyond nomenclature information provided in the ontologies). These factors expedite the generation of the linking component. Further, with a text corpus that is suitably large, these factors also contribute to the generation of a large number of training examples, which, in turn, leads to the generation of a robust linking component. In other words, insofar as the technique does not require handcrafted and specialized input resources, it can effectively exploit a large text corpus to generate a large number of training examples.

Further, the linking component that is trained based on the text corpus provides useful results when applied to various domains that are not well represented by the text corpus itself. For example, the text corpus may correspond to a large general-purpose corpus of medical-related literature. The linking component that is trained based on this textual resource can be applied to special medical-related subdomains that are not well represented by the text corpus, such as patient medical records.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 is a flowchart that shows one manner of operation the system of FIG. 1.

FIG. 12 is a flowchart that shows one manner of operation of the search system of FIG. 4.

FIG. 13 is a flowchart that shows one manner of operation of the document creation system of FIG. 5.

Figure 1:
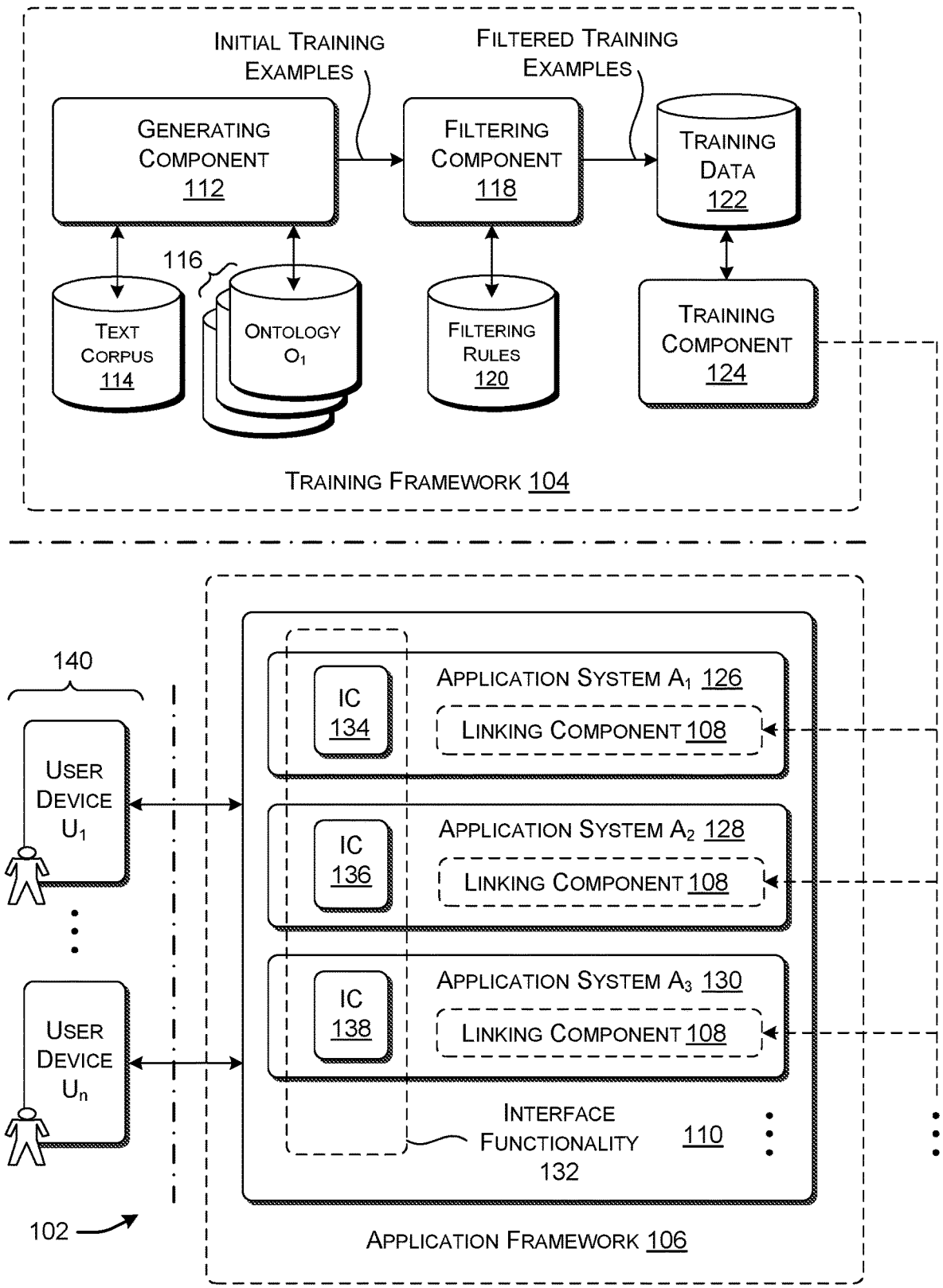
FIG. 1 shows a system for generating a linking component, and then using the linking component to map input entity mentions to corresponding entity identifiers.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes the operation of a system for training and applying a linking component. Section B describes the operation of the system of Section A in flowchart form. And Section C describes illustrative computing functionality that can be used to implement any processing-related aspect of the features described in the preceding sections.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," "functionality," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Training Framework

FIG. 1 shows a system 102 that includes a training framework 104 and an application framework 106. The training framework 104 generates a linking component 108 through a machine-learning process. The application framework 106 provides various applications systems 110 that apply the linking component 108. The linking component 108 performs the task of mapping one or more respective entity mentions in a document, or in some other text-related context, to one or more respective entity identifiers.

An "entity" describes a particular person, place, object, concept, organization, condition, state, etc., and is often associated with a proper noun. An "entity identifier" refers to a primary designator that an ontology uses to uniquely refer to the entity. In some cases, an entity identifier may correspond to a canonical term that an ontology uses to refer to an entity. In other cases, an entity identifier may correspond to a record ID that the ontology assigns to a record associated with an entity. Other environments may interpret an entity identifier in some other manner.

An "ontology" refers to a dictionary-like resource that identifies a set of entities pertaining to a prescribed subject matter domain. Various actors may govern the creation and maintenance of an ontology. For instance, in one case, a medical-related standards organization may create and control an ontology pertaining to drug names. In another case, a company may create and control an ontology pertaining to the nomenclature associated with the products and/or services that it provides. In one case, an ontology may limit itself to nomenclature information. In other cases, an ontology may contain additional descriptive information regarding the entities it describes. Yet, as described below, the system 102 does not rely on any such supplemental information.

An "entity mention" refers to any way that a document or some other content item may refer to an entity. In some cases, a document may refer to an entity using a canonical term or some variant thereof. In other cases, a document may refer to an entity using a synonym of the canonical term, or some variant thereof.

For example, the HUGO Gene Nomenclature Committee (HGNC) administers an ontology that defines the names used to refer to human genes. For instance, that ontology indicates that "estrogen receptor 1" is the canonical term used to refer to a particular human gene. That canonical term may as be regarded as the entity identifier for that gene. The entity in this example corresponds to the gene itself. The ontology also identifies a set of other reference terms that have been used in the medical literature to refer to the same gene, including: "E2 receptor alpha,", "ER-alpha," "Era," "estrogen receptor alpha," "NR3A1," "nuclear receptor subfamily 3 group A member 1," and "oestrogen receptor alpha." These other reference terms may be considered as synonyms of the canonical term "estrogen receptor 1." Note that these various terms have a high degree of lexical variation, meaning that they are not simply spelling variations of the accepted canonical term.

With respect to the above example, the linking component 108 maps an entity mention associated with the above gene to the unique entity identifier associated with that term. For example, assume that a document contains the term "ER-alpha." The HGNC ontology indicates that this term is one way that the literature uses to refer to the estrogen receptor 1 gene. Therefore, the term "ER-alpha" may be regarded as an entity mention. The linking component 108 maps the entity mention "ER-alpha" to the established entity identifier "estrogen receptor 1."

This subsection describes the training framework 104 in detail, and closes with an overview of the application framework 106. The next subsection (A.2) provides additional information regarding the application framework 106. And the last subsection provides additional information regarding the linking component 108 itself.

Note that the following explanation will continue to describe the system 102 in the illustrative context of a medical-related environment. However, the system 102 can be applied to any subject matter environment(s). In another example, the system 102 can apply the linking component 108 to interpret terms in a technology-related environment, such as a computer-related and/or electronics-related environment. In another example, the system 102 can apply the linking component 108 to interpret information pertaining to security threats. For instance, the system 102 can use the linking component 108 to translate entity mentions in electronic intercepts into canonical names associated with those individuals, places, and events.

The training framework 104 produces the linking component 108 in three phases. In a first phase, a generating component 112 generates a set of initial training examples based on a text corpus (provided in a data store 114) and one or more ontologies (provided in one or more data stores 116). A filtering component 118 filters the initial training examples with reference to a set of filtering rules (in a data store 120), to provide a set of filtered training examples. This filtering operation has the effect of removing or otherwise discounting noisy and potentially inaccurate training examples. The filtering component 118 stores the filtered training examples in a data store 122. The training examples in the data store 122 collectively constitute a training set.

Finally, a training component 124 uses a machine-learning process to generate the linking component 108 based on the training set. The training component 124 performs this task by iteratively generating a set of parameter values Λ that collectively define a machine-learned model. The linking component 108 corresponds to computing equipment that runs the machine-learned model. Once trained, the training component 124 transfers the linking component 108 to the application framework 106. The training component 124 performs this task by transferring the set of parameter values Λ that define the machine-learned model to the application framework 106.

Overall, the training framework 104 applies a distant supervision strategy to train the linking component 108, e.g., by leveraging the ontology(ies) in the data stores 116 to produce labeled training examples, rather than a team of human annotators. The following explanation provides additional details regarding the operation of the generating component 112, the filtering component 118, and the training component 124.

The Generating Component

The generating component 112 operates by comparing each term that appears in the text corpus with the reference terms in each of the ontologies. The generating component 112 can perform this comparison using any matching strategy. In one case, the generating component 112 registers a match when a term in the text corpus exactly matches a reference term in one of the ontologies. In another case, the generating component 112 registers a match when a term in the corpus is determined to be sufficiently similar to a reference term in one of the ontologies, where similarity can be measured with respect to any criteria (e.g., edit distance) and with respect to any environment-specific threshold(s). Whatever comparison strategy is used, a term in the text corpus that matches a reference term in an ontology constitutes an entity mention.

Upon a match, the generating component 112 stores an initial training example in a data store. In one implementation, an initial training example specifies the entity mention that has been determined to match a reference term in an ontology. The generating component 112 also stores whatever entity identifier the ontology uses to uniquely identify the entity associated the entity mention. The generating component 112 can also store information regarding the textual context in which the entity mention occurs within the text corpus. For example, the textual context may correspond to a snippet of text in which the entity mention appears in the text corpus.

The text corpus in the data store 114 can correspond to any textual resources pertinent to a subject matter environment. In the medical environment, the text corpus may corresponds to a broad range of medical literature that is accessible through the PubMed search engine. As will be set forth in greater detail below, the text corpus may generally pertain to a first subject matter domain, yet any application system may apply the trained linking component 108 to a second subject matter domain, where the first subject matter domain differs from the second subject matter domain.

In one case, the group of ontologies can include various sources that provides nomenclature regarding genes, diseases, and treatment options. For example, the system 102 can use an ontology pertaining to human genes provided by the HUGO Gene Nomenclature Committee (HGNC). The system 102 can use the MeSH ontology pertaining to human diseases provided by the National Institutes of Health (NIH). The system can use the DrugBank ontology pertaining to drugs, which is affiliated with the University of Alberta and the Metabolomics Innovation Centre.

In the above cases, the text corpus is separate from the ontologies. But in another example, the documents in the text corpus can incorporate structured nomenclature information that constitutes part of one or more ontologies.

Figure 2:
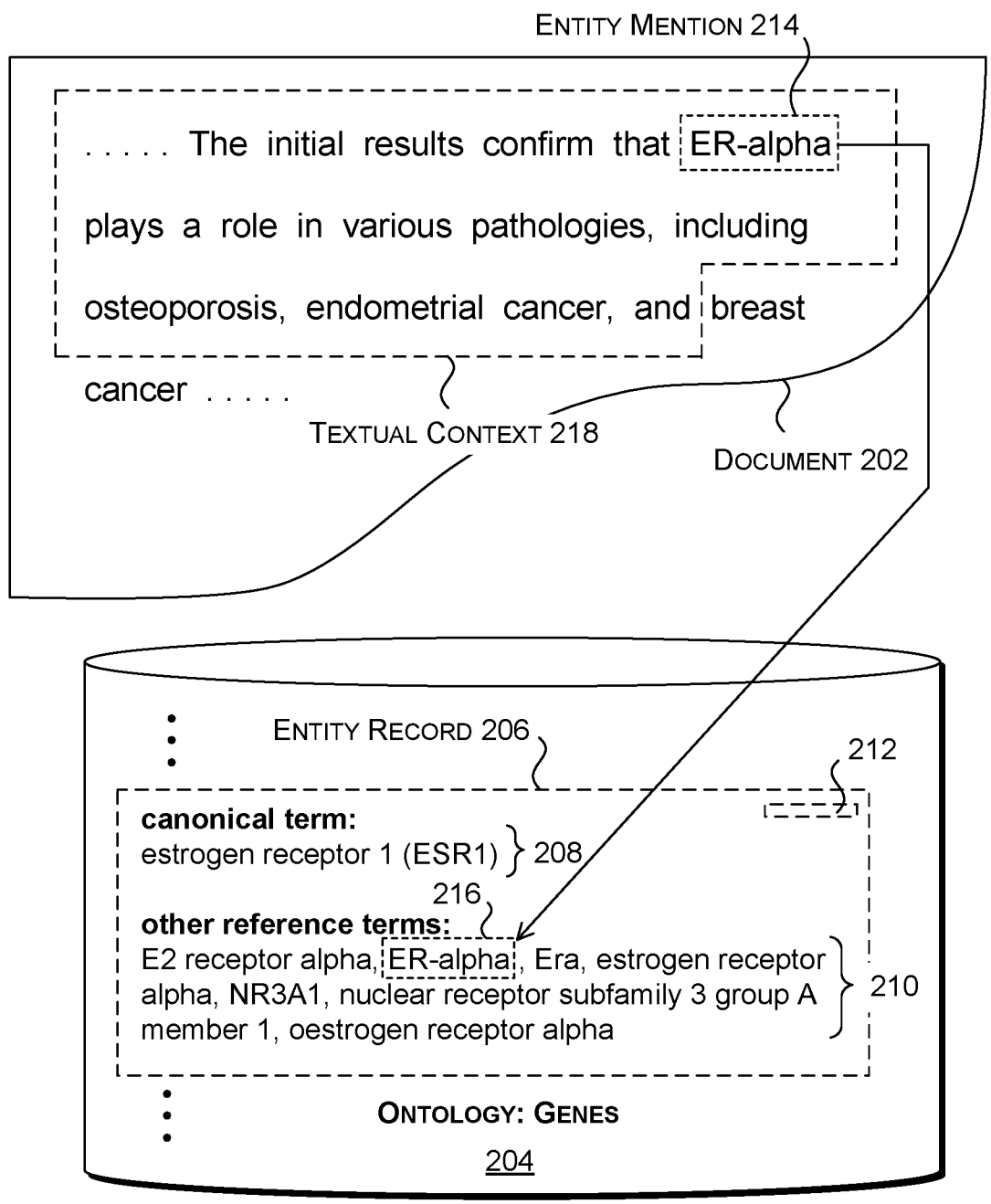
FIG. 2 shows an example of one manner in which the system of FIG. 1 generates training examples.

Advancing momentarily to FIG. 2, this figure shows an example of the manner in which the generating component 112 creates an initial training example. Assume that that the text corpus includes a collection of documents, such as a collection of documents available through the PubMed search engine. One such document 202 contains the textual passage "The initial results confirm that ER-alpha plays a role in various pathologies, including osteoporosis, endometrial cancer, and breast cancer . . . ." One ontology, maintained in a data store 204, stores terminology pertaining to human genes, e.g., as provided by the HGNC.

More specifically, FIG. 2 shows an example record 206 associated with a specific entity within the HGNC ontology. That record 206 corresponds to a gene that is referred to by the canonical term "estrogen receptor 1" 208. The record 206 also specifies other reference terms 210 associated with the gene. In one case, a given ontology might designate the canonical term 208 as the entity identifier. In another case, the ontology might designates a record ID 212 associated with the record 206 as the entity identifier, and so on. Assume that the HGNC ontology defines the canonical term 208 as the entity identifier, and the entity identifier will henceforth be referred to as such.

The generating component 112 will discover, upon comparing each term of the document 202 with the nomenclature in the HGNC ontology, that a term "ER-alpha" 214 in the document 202 matches a reference term 216 in the HGNC ontology. This term 214 therefore constitutes an entity mention, and will be henceforth referred to as such. In response to this finding, the generating component 112 will store an initial training example that includes: (1) an entity mention ("ER-alpha") 214 that matches the reference term 216 in the HGNC ontology; (2) the entity identifier 208 associated with the entity mention 214; and (3) a textual context 218 in which the entity mention appears. In one case, the textual context 218 may correspond to a prescribed number of words that precede the entity mention 214, together with a prescribed number of words that follow the entity mention 214. Here, the textual context 218 corresponds to the phrase, "The initial results confirm that ER-alpha plays a role in various pathologies, including osteoporosis, endometrial cancer, and." In other cases, the generating component 112 can store contextual information regarding a larger passage of text in which the entity mention 214 appears, and/or metadata pertaining to the document 202 as a whole, etc. Although not shown in FIG. 2, the generating component 112 can also store information in each initial training example that describes the ontology from which it derives, if that information is not already implicitly conveyed by the entity identifier.

Note that there is a one-to-one mapping between the entity mention "ER-alpha" 214 and the entity identifier 208, corresponding to the canonical term "estrogen receptor 1." In other cases, a single entity mention can map to two or more entity identifiers. The generating component 112 will store separate initial training examples for each such pairing of entity mention to an entity identifier. For example, consider the alternative example (not shown) in which the document 202 uses the synonym "Era" to refer to the gene "estrogen receptor 1." That same entity mention may also be found in a disease database, e.g., corresponding to an acronym for the condition "enthesitis-related arthritis." It is the ultimate task of the trained linking component 108 to distinguish which pairing is correct—that is, to answer the question of whether "Era" refers to a gene or a medical condition.

Further note that, in the vast majority of cases, an entity mention does not map to multiple entities within a same entity type. An entity type, as that term is used herein, refers to a category of entities. For example, "drugs" would correspond to one entity type. "Diseases" would correspond to another entity type, and so on. In this context, it is rare to have an entity mention map to two or more drugs in the same database or two or more diseases in the same database, etc. In a manner more fully described in Subsection A.3, the linking component 108 leverages this property of mutual exclusivity in determining the probability associated with any mention-identifier pairing.

The Filtering Component

Returning to FIG. 1, the filtering component 118 applies a set of filtering rules (in the data store 120) to each initial training example. Overall, the filtering component 118 aims to remove or otherwise devalue training examples in the set of initial training examples that are considered too noisy. A training example is considered "noisy" or ambiguous when there is a low likelihood that the pairing between its entity mention and its entity identifier is accurate. By virtue of removing (or otherwise devaluing) noisy training examples, the training framework 104 improves the quality of the training set fed to the training component 124.

In certain cases, a rule operates to directly identify characteristics of a training example that indicate that it is noisy; here, the filtering component 118 can designate the training example as potentially noisy when it matches such a rule. In other cases, a rule operates to determine characteristics of a training example that indicate that it is particularly unambiguous; here, the filtering component 118 can designate a training example as potentially noisy when it does not meet such a rule.

The filtering component 118 can discount a training example in different ways. In one implementation, the filtering component 118 discounts a training example by removing it from the final training set. Alternatively, or in addition, the filtering component 118 discounts a training example by reducing a weight value assigned to the training example, which has the effect of diminishing its impact on the subsequent training operation.

Note that the filtering component 118 has the effect of placing limitations on the training set that is fed to the training component 124. But these restrictions do not extend to the application of the trained linking component 108 by the application framework 106. That is, in the real-time phase of operation, an application system can apply the linking component 108 to a kind of entity mention that was excluded from the training set in the training phase of operation.

Different environments can adopt different rules. Without limitation, one filtering rule specifies that a training example is too noisy (and should therefore be excluded) when its associated entity mention has a character length below a prescribed threshold length. This rule can specify the threshold length in a manner that depends on the type of entity under consideration. For example, this rule can specify that an entity mention pertaining to a disease name is invalid when it has less than five characters. On the other hand, the rule can specify that an entity mention pertaining to a gene name is invalid when it contains less than three characters, and so on. The above consideration more generally applies to any rule; that is, the behavior of any rule can depend on one or contextual factors, including the entity type to which it is applied.

Another rule specifies that a training example is too noisy when its entity mention maps to two or more reference terms in two or more respective ontologies. For example, assume that a document contains the entity mention "Era." That entity mention may map to the gene "estrogen receptor 1" and the condition "enthesitis-related arthritis." The filtering component 118 would therefore exclude both of these examples.

Another rule specifies that a training example has a particular high confidence when two or more entity mentions within a same sentence, paragraph, page, or document, etc. map to a same entity identifier within an ontology. For example, consider a document that includes both the entity-related terms "ER-alpha" and "estrogen receptor alpha." The rule would assign a high value to both of these corresponding training examples because both of these terms map to the same entity identifier associated with the gene "estrogen receptor 1." Moreover, this filtering rule can provide a particularly high weight value to any training example in which two reference terms that pertain to the same entity appear next to each other (or in defined close textual proximity to each other) within a document, as when a document includes the phrase "estrogen receptor 1 (NR3A1)"; here, the author designates that "NR3A1" is an alternative name for the term "estrogen receptor 1."

Other filtering rules can take account for grammatical properties of a training example's entity mention. For example, such a rule can indicate that an entity mention is potentially noisy when there is low confidence that it corresponds to a proper noun.

The above-described filtering rules are set forth by way of illustration, and not limitation. Other implementations can provide other rules. The filtering component 118 can also allow an end user to create custom filtering rules, and/or modify the behaviors of existing filtering rules.

The Training Component

The training component 124 generates the linking component 108 based on the filtered training examples in the data store 122. More specifically, each example provided by the filtering component 118 corresponds to a positive training example. This is because the example's association between its entity mention and its entity identifier is assumed by default to be accurate. The training component 124 can provide a set of negative examples in any manner. For example, the training component 124 can generate each negative example for a given entity in an ontology by randomly matching the entity's entity identifier (e.g., its canonical term) to any noun that appears in the text corpus, e.g., by matching the canonical term "estrogen receptor 1" with the randomly chosen word "bandage." That pairing, because it is arbitrary, is assumed to be incorrect.

The training component 124 can use machine-learning to achieve a specified training objective, such as maximizing the likelihood that the linking component 108 will generate a correct entity identifier (e) given an entity mention (m). That is, the training component 124 can minimize the following loss function:

$$L(\Lambda) = -\log \prod_{(m,e^+)} P(e^+|m). \quad (1)$$

In this expression, $e^+$ refers to a correct entity identifier, given a specified entity mention m. The training component 124 can achieve this objective in an iterative manner, e.g., by performing optimization using well known gradient-based techniques. The symbol $\Lambda$ refers to a set of parameter values that define a machine-trained model.

Now referring to the application framework 106, FIG. 1 generally shows a plurality of applications systems (126, 128, 130, . . . ) that can leverage the linking component 108 to perform various functions. For example, the first application system 126 can apply the linking component 108 to find at least one document (or other textual content item) that pertains to a specified entity. Or the first application system 126 can apply the linking component 108 to find two or more documents that pertain to at least one common entity, and/or which have some other entity-based relation. A second application system 128 can apply the linking component 108 in the course of creating a new document. A third application system 130 can apply the linking component 108 as a preliminary operation to some other "downstream" operation, such as relation extraction or document clustering, etc. The above-described three applications are set forth here by way of illustration, not limitation; other implementations can provide other application systems that make use of the linking component 108 in other ways.

Each application system may provide interface functionality 132 through which a user may interact with the application systems 110, and through which the application system can interact with other system resources. The interface functionality 132 includes interface components (134, 136, 138, . . . ) respectively associated with particular application systems (126, 128, 130, . . . ). For example, an interface component may provide one or more pages through which the user may supply input information to an application system, and/or receive output information from the application system.

FIG. 1 also shows a collection of user computing devices 140. A user may interact with any application system via one of these user computing devices 140. In some cases, a user computing device interacts with a remote application system via a computer network. In other cases, a user computing device hosts a local application system.

Figure 3:
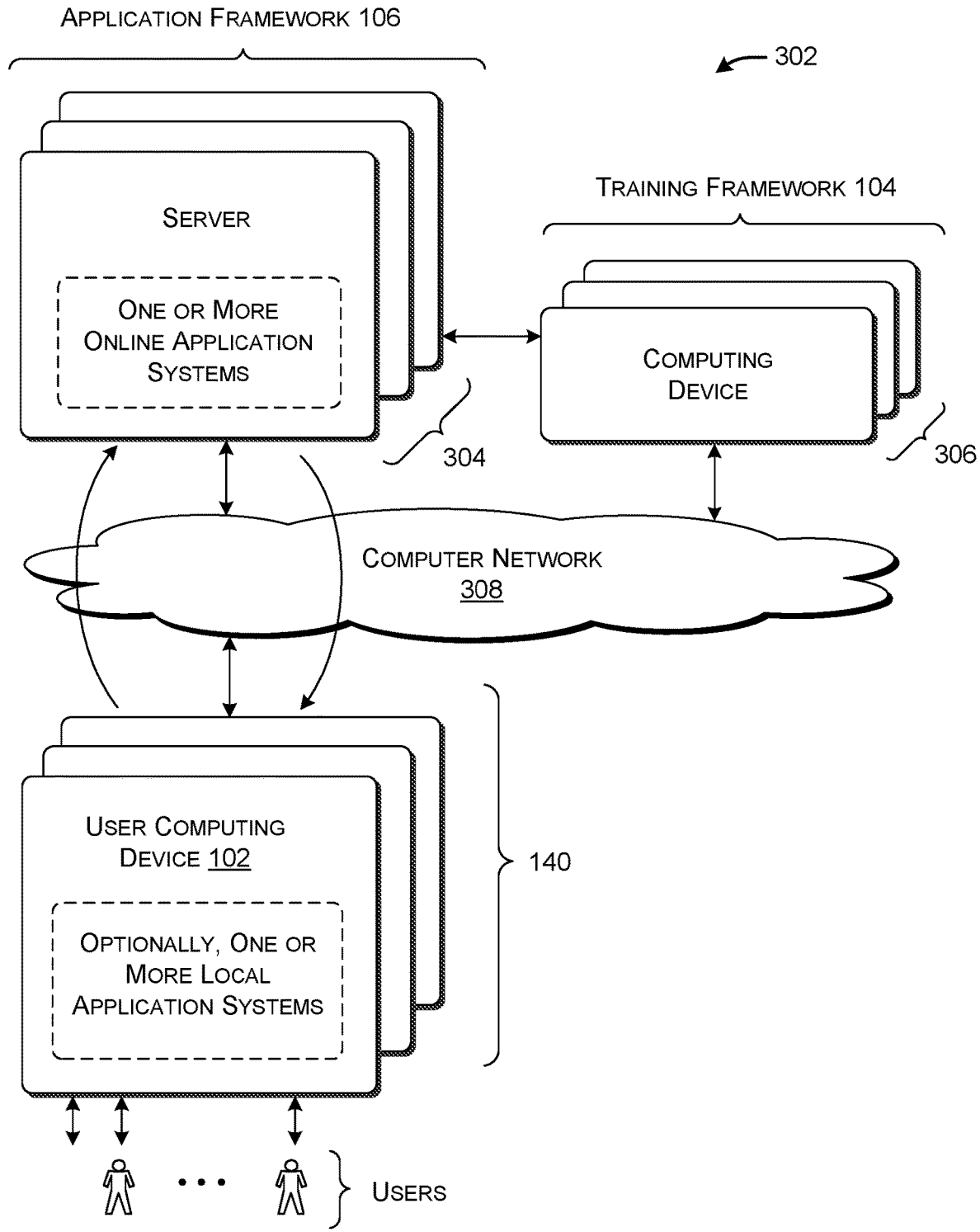
FIG. 3 shows computing equipment that can be used to implement the system of FIG. 1.

More specifically FIG. 3 shows computing equipment 302 that can be used to implement the system 102 of FIG. 1. In one implementation, the computing equipment 302 can include one or more servers 304 that implement the application framework 106, and one or more servers 306 (and/or other type(s) of computing devices) that implement the training framework 104. The computing device(s) that implement the training framework 104 can update the linking component 108 on any basis, e.g., a periodic basis, a demand-driven basis, etc. Upon each update, the training framework 104 can transfer the trained linking component 108 to the server(s) 304 that implement the application framework 106. In other implementations, a common set of computing resources can implement one or more functions of the training framework 104 and the application framework 106.

A plurality of user computing devices 140 interact with the server(s) 304 of the application framework 106 via a computer network 308. Any user computing device can correspond to, without limitation, any of: a desktop computing device; a laptop computing device; a smartphone; a tablet-type computing device; a set-top box; a game console; a virtual/augmented reality device; a wearable computing device, and so on. Any user computing device can interact with the user interface component of an application system via a browser program. The computer network 308 can correspond to a wide area network (e.g., the Internet), a local area network, one or more point-to-point links, etc.

Alternatively, any application system can be entirely hosted by a local user computing device. Alternatively, any application system can be hosted in distributed fashion, e.g., by allocated one or more application functions to a remote server and one or more application functions to a local user computing device.

In conclusion to Subsection A.1, the training framework 104 has various technical characteristics which contribute to the generation of a robust machine-learned model in an efficient manner. First, note that the training framework 104 can generate the linking component 108 using just a general-purpose text corpus (e.g., as provided by the PubMed search engine), together with the nomenclature information provided in a collection of ontologies. The training framework 104 does not require the painstaking and costly task of manually annotating training examples. Further, the training framework 104 does not require the use of special evidence regarding the characteristics of the entities described in the ontologies. For instance, the training framework 104 does not require the use of reference sources which describe the characteristics of various diseases; it leverages only the names associated with those diseases. These aspects speed up the generation of the linking component 108, e.g., because the training framework 104 does not require the time-consuming task of labeling examples, nor does it require acquiring supplemental evidence regarding the entities to be classified. In some subject matter domains, it is particularly useful to dispense with the need for Wikipedia-type resources because this information may not be readily available.

It is true that the above-described strategy can lead to the production of ambiguous training examples. But the training framework 104 addresses this concern through its filtering operation. Metaphorically, the training framework 104 casts a wide net in its collection of initial training examples, and then weeds out training examples that are too noisy, with respect to the criteria specified in the filtering rules.

As another feature, the training framework 104 can leverage a relatively large sized text corpus. This aspect contributes to the generation of many training examples, which, in turn, contributes to the ultimate production of a robust machine-learned model. The training framework 104 is able to leverage a large text corpus for the reasons stated above, that is, because it does not burden the example-mining process with certain constraints that serve to slow it down and limit its scope.

In some cases, the text corpus corresponds to a first subject matter domain, while the application framework 106 applies the trained linking component 108 in a second domain. The second domain may not match the first domain. For example, the first subject matter domain may encompass published literature pertaining to all aspects of medicine. But the first domain may not specifically target documents in the specific subdomain of electronic medical records. Nevertheless, the trained linking component 108 provides useful results when applied to the subdomain of electronic medical records. This property ensues, in part, from the relatively large size of the text corpus, which leads to the production of a robust machine-trained model, even though the text corpus is not tailored to the electronic medical record subdomain.

A.2. Example Application Systems

Figure 4:
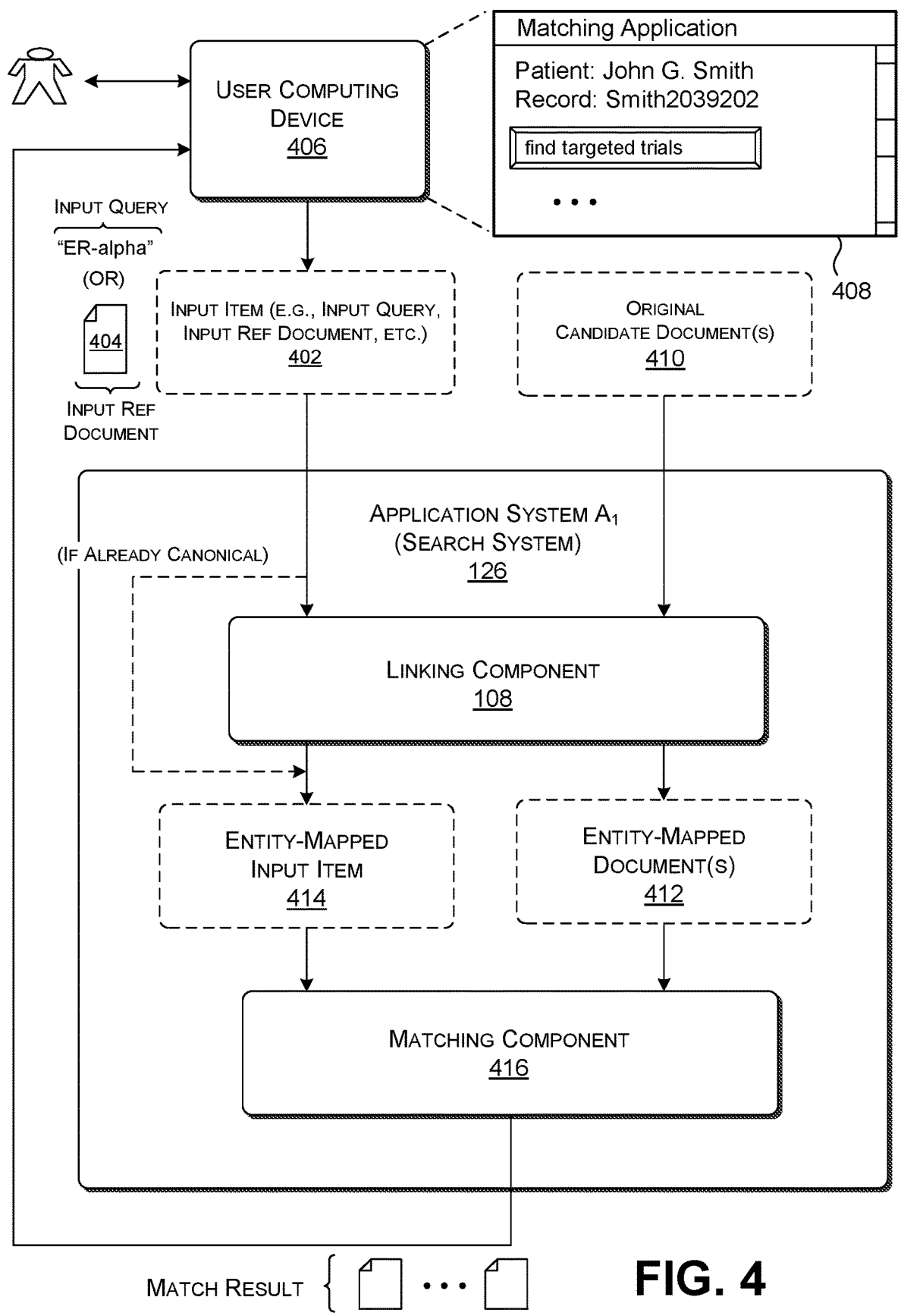
FIG. 4 shows a search system that can apply the linking component.

FIG. 4 shows a search system 126 that can apply the linking component 108 trained by the training framework 104. Generally, the purpose of the search system 126 is to find one or more documents of interest, given a specified input item 402. In one case, the input item 402 can correspond to an input query that includes one or more entity mentions. For example, the input query can correspond to the string "ER-alpha," which is a reference term associated with a particular gene. Here, the intent of the user is to find any documents that pertain to the gene in question. More generally, the input query can specify any logical combination of one or entity mentions, together with zero, one or more other terms that are not entity mentions.

Or the input item 402 can correspond to an input reference document 404 that includes one more entity mentions. For example, the input reference document 404 may correspond to a patient electronic medical record that includes at least the entity mention "ER-alpha." Other entity mentions in the patient's electronic medical record may describe the medical conditions affecting the patient, the drugs that the user is current taking and/or is planning to take, and so on. Here, the intent of the user is to find any documents that pertain to the user's current circumstance, as reflected in the electronic medical record. In a more specific case, the intent of the user may be to find information regarding clinical trials that may apply to the user in his or her present medical circumstance.

In one case, one or more remote servers implement the search system 126. The user may interact with the search system 126 via a user computing device 406. Alternatively, the search system 126 may correspond to a local application provided by the local user computing device 406, or a distributed application provided by both the local user computing device 406 and remote computing functionality, etc.

In any case, the interface component 134 (shown in FIG. 1) can provide a user interface presentation 408 through which the user may interact with the search system 126. In one merely illustrative case, the user interface presentation 408 can provide an input field for receiving a user's input query, e.g., the query "ER-alpha." Alternatively, or in addition, the user interface presentation 408 can provide a control feature that allows a user to specify the input reference document 404. For example, the user interface presentation 408 can provide an input field that allows the user to indicate that a search is to be performed based on a specified electronic medical record.

Generally, the search system 126 operates by determining whether any original candidate documents 410 (provided in a data store) are suitable matches for the input item 402. In one case, for instance, the original candidate documents 410 may correspond to a plurality of electronic records describing clinical trials. The one or more candidate documents 410 will henceforth be referred to in the plural to simplify the explanation.

The linking component 108 performs nomenclature normalization on the input item 402 and/or the original candidate documents 410. For instance, the linking component 108 can identify all of the entity mentions in the original candidate documents 410. It can perform this task by comparing each term in the original candidate documents 410 with each reference term specified in a group of ontologies. The linking component 108 can then tag those entity mentions with entity identifiers associated with the entities to which the entity mentions correspond. For example, the linking component 108 can tag the entity mention "ER-alpha" in a clinical trial document with metadata that identifies this term's entity identifier ("estrogen receptor 1"). In the terminology used here, this process yields a collection of entity-mapped documents 412, which it stores in a data store. Alternatively, the linking component 108 can perform at least part of the above-described operation on the original candidate documents 410 as a preliminary offline process, e.g., prior to the time that the user submits the input item.

In one case, the input item 402 can specify one or more entity mentions without any constraint on the form of those entity mentions. For example, in a first case, the user may choose to specify a synonym of a canonical term. In that case, the linking component 109 can tag any entity mentions in the input item 402 with corresponding entity identifiers. In another situation, the search system 126 may force the user to specify any entity in the input item 402 using its approved entity identifier, e.g., it canonical term. In that case, the linking component 108 need not operate on the input item. In any event, the search system 126 provides an entity-mapped input item 414.

A matching component 416 compares the entity-mapped input item 414 with the entity-mapped documents 412 to generate a match result. The matching component 416 can then deliver the match result to the user via the user interface presentation 408. The matching component 416 can perform matching using any technique, such as a lexical matching technique, a semantic matching technique, or any combination thereof. For instance, in one case, the matching component 416 can perform matching by comparing the entity identifier(s) in the entity-mapped input item 414 against the entity identifier(s) in the entity-mapped documents 412 (e.g., using an exact match strategy or an approximate-match system defined with respect to any metric(s) of text similarity (such as edit distance) and any environment-specific threshold value(s)). Alternatively, or in addition, the matching component 416 can perform matching by converting the entity-mapped input item 414 into a first semantic vector in low-dimensioned semantic space (e.g., using a first deep neural network), and convert each entity-mapped document into a second semantic vector in the same low-dimensioned semantic space (e.g., using a second deep neural network). The matching component 416 can then compare the two vectors using any distance metrics, such as cosine similarly. The result of this comparison reflects the similarity between the input item and that particular entity-mapped document.

Figure 5:
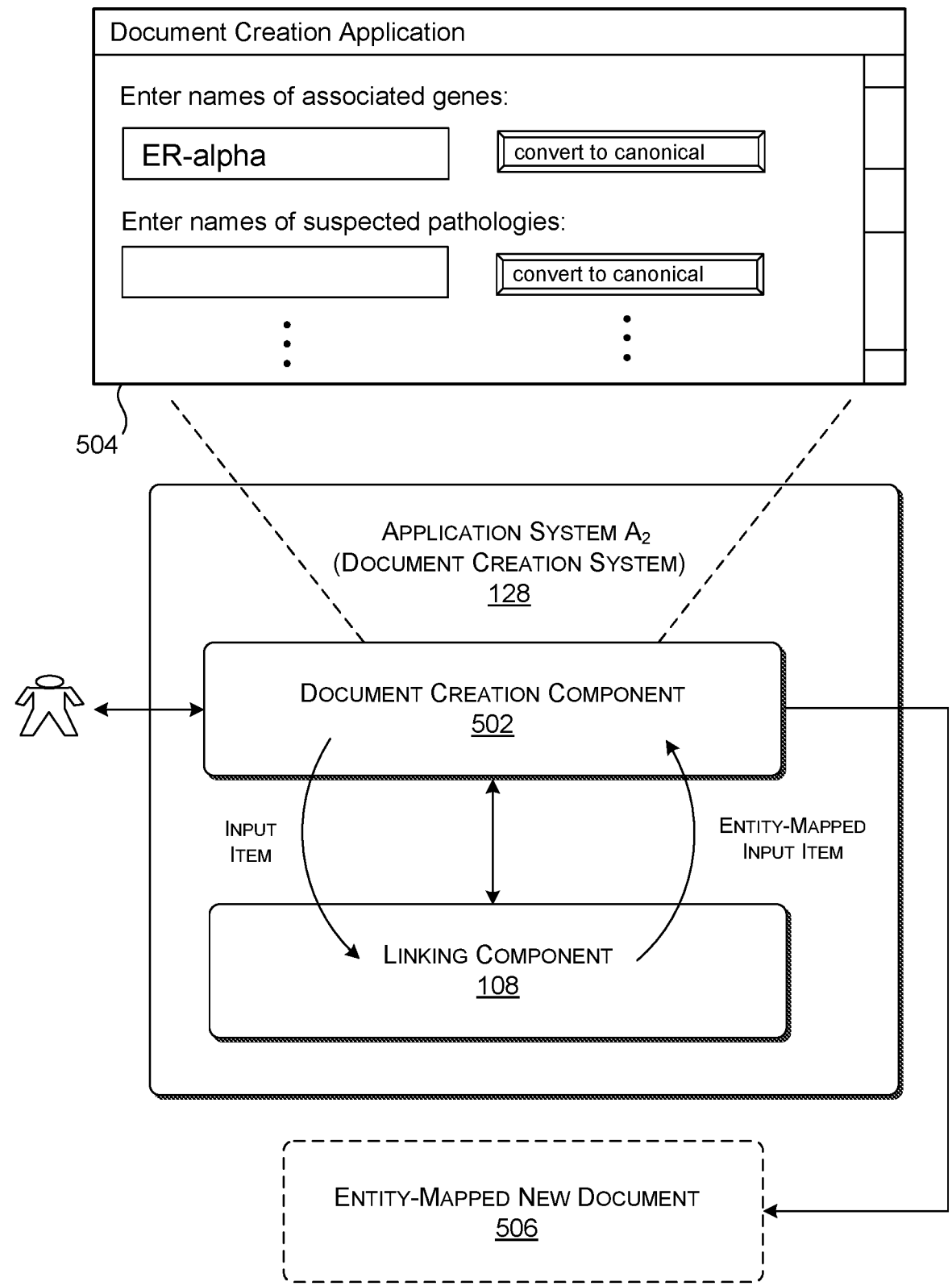
FIG. 5 shows a document creation system that can apply the linking component.

FIG. 5 shows a document creation system 128 that can apply the linking component 108. In this context, the linking component 108 identifies entity mentions in the course of the user's creation of a new document. The linking component 108 can then tag these entity mentions with their corresponding entity identifiers. The document creation system 128 can be implemented in the same manner as the search system 126, e.g., by any of: (1) one or more remote servers; (2) a local user computing device; and (3) a distributed combination of remote computing resources and the local computing device.

A document creation component 502 may host a user interface presentation 504 that allows a user to create a new document. In one case, the document creation component 502 performs this function by providing word processing functionality. Alternatively, or in addition, the document creation component 502 performs this function by allowing a user to input textual information in predefined fields of a form. FIG. 5 illustrates the latter case.

In one implementation, the document creation component 502 calls on the linking component 108 whenever the user finishes inputting a term. The linking component 108 will then determine: (1) whether the input term corresponds to an entity mention; and (2), if so, the entity identifier associated with the entity mention. More generally, through this process, the document creation component 502 in cooperation with the linking component 108 transforms each input item into an entity-mapped item.

The document creation component 502 can act on an entity identifier in different ways. In one approach, the document creation component 502 just annotates each entity mention with its corresponding entity identifier, and stores information regarding that association. Alternatively, or in addition, the document creation component 502 can replace any entity mention with its canonical term counterpart, which is identified by the entity identifier.

Altogether, the document creation component 502 generates an entity-mapped new document 506. This means that the document creation component 502 produces a document that embeds information regarding the entity identifiers associated with respective entity mentions.

Figure 6:
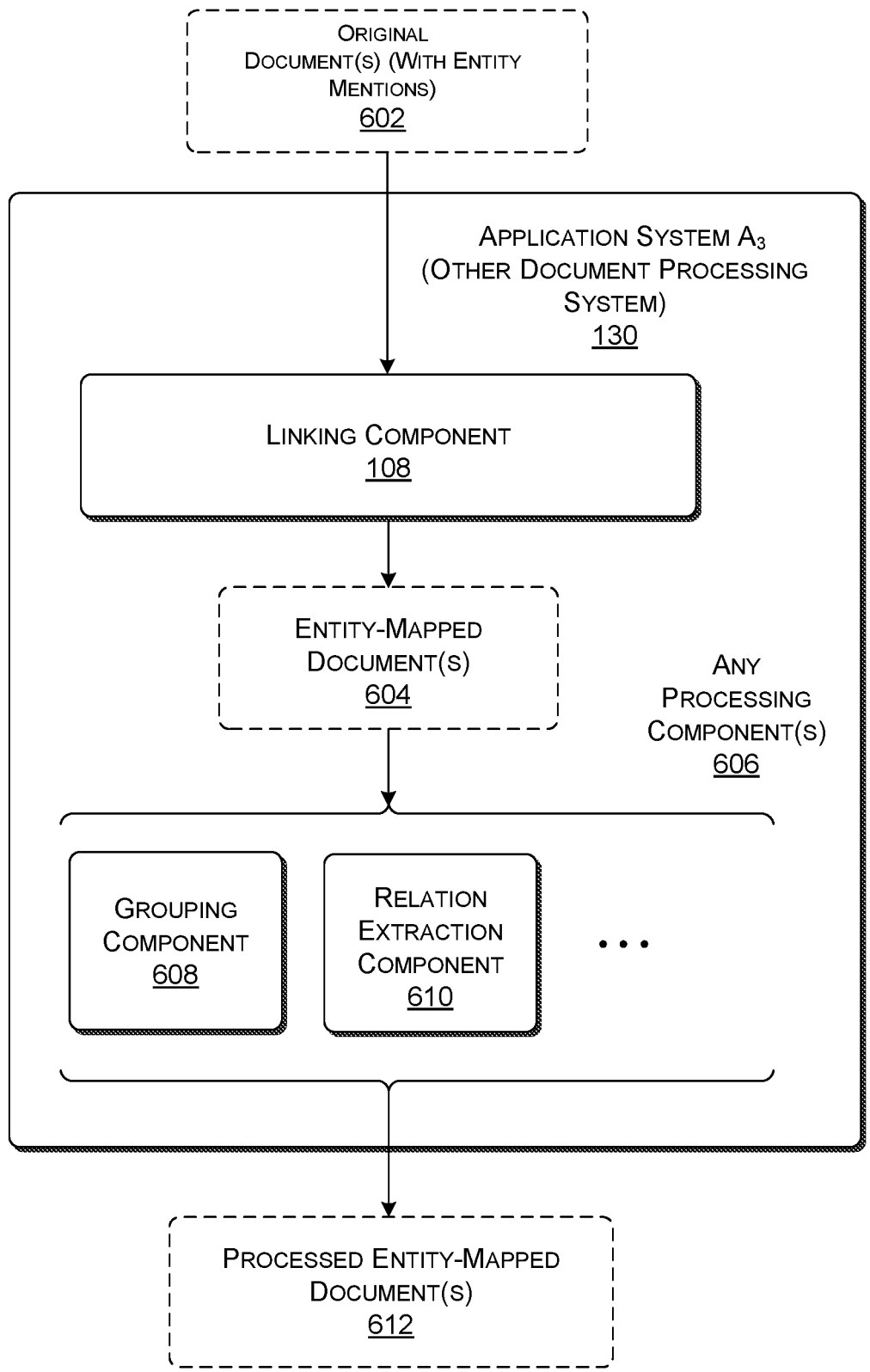
FIG. 6 shows a document processing system that can apply the linking component.

FIG. 6 shows a document processing system 130 that can apply the linking component 108. In this context, the linking component 108 transforms one or more original documents 602 to entity-mapped documents 604 in the same manner described above. That is, the linking component 108 determines: (1) whether each term in a document is an entity mention; and (2) if so, the entity identifier associated with the entity mention. The document processing system 130 can tag each entity mention with its entity identifier and/or replace each entity mention with its corresponding canonical term, associated with its entity identifier.

The document processing system 130 can then apply any subsequent processing on the entity-mapped documents 604, including a grouping operation, a relationship extraction component, and so on.

More specifically, a grouping component 608 can cluster together entity-mapped documents 604 on the basis the entity identifiers associated with those documents. For example, the grouping component 608 can form a cluster of documents pertaining to a particular entity or a particular logical combination of entity identifiers. The grouping component can 608 can use any technology to form clusters, such as by forming lists of documents that contain specified entity identifiers, and then logically combining (e.g., intersecting) those lists to find the desired combination of entity identifiers. For example, the grouping component 608 can form a first list of documents that contain the entity identifier associated with a particular gene, and a second list of documents that contain the entity identifier associated with a particular disease. The grouping component 608 can then form the desired cluster by intersecting the first and second lists.

A relation extraction component 610 can use any technique to extract relationships between entities. For example, the relation extraction component 610 can identify instances in which a first entity identifier of-interest appears within a prescribed textual distance from a second entity identifier of-interest. The relation extraction component 610 can then apply rules and/or a machine-trained model to determine whether the collected evidence constitutes a relation between the two specified entity identifiers.

The above-described processing components 606 are cited by way of example, not limitation. The general point of FIG. 6 is to illustrate that the linking component 108 may provide a service that facilitates the operation of various downstream processing components. For instance, the grouping component 608 can form more precise clusters by virtue of the fact that the linking component 108 has resolved the entity-related status of terms in the entity-mapped documents 604. Overall, the document processing system 130 generates one or more processed entity-mapped documents 612.

The application systems 110 confer various benefits. For example, the search system 126 of FIG. 4 can allow a healthcare provider to quickly and accurately match a patient's profile (as described in the patient's electronic medical record) with documents describing clinical trials that may be relevant to the patient. This is a considerable advantage because time is often of the essence in treating a patient with a progressive ailment, such as cancer.

A.3. Example Linking Components

Figure 7:
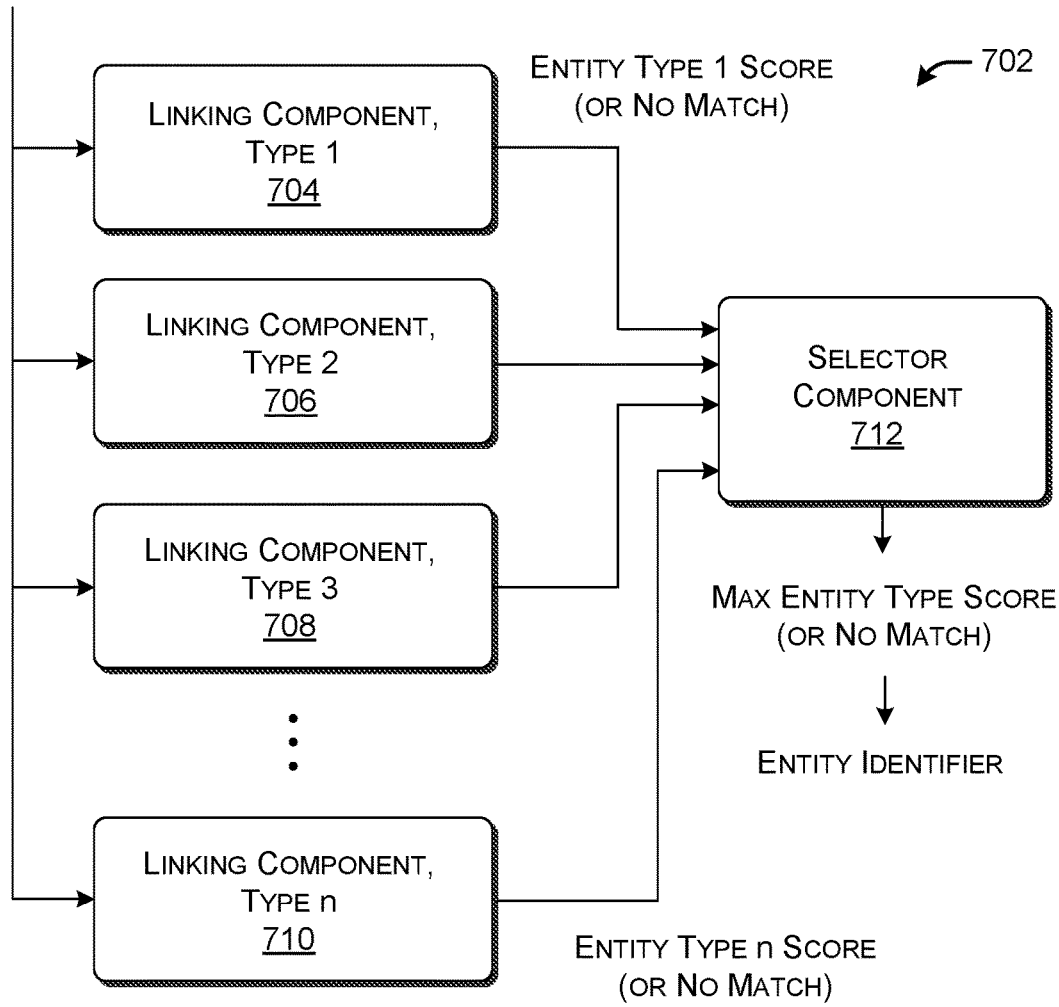
FIG. 7 shows a first general architecture of a linking component.

FIG. 7 shows a first general architecture of a linking component 702, which corresponds to one implementation of the above-described linking component 108. In this architecture, the linking component 702 includes a set of two or more type-specific linking components (704, 706, 708, . . . , 710). Each type-specific linking component is dedicated to making an assessment with respect to a particular ontology. That ontology, in turn, is associated with a particular entity type. For example, the first type-specific linking component 704 can perform an assessment with respect to the entity type of genes. The second type-specific linking component 706 can perform an assessment with respect to diseases, and so on.

Each type-specific linking component first determines whether the input item contains any entity mentions. It performs this task by searching each term of the input item against the component's associated ontology to determine whether it contains a matching reference term. If a reference item is found, the term constitutes an entity mention. The type-specific linking component then identifies a textual context that contains the entity mention. The type-specific linking component then determines a score for the entity type in question, based on the textual context. That score reflects the likelihood that the identified entity mention corresponds to the particular entity type associated with the type-specific linking component.

A selector component 712 selects among the entity types based on the scores generated by the type-specific linking components (704, 706, 708, . . . , 710). For example, the selector component 712 can choose the maximum score generated by the type-specific linking components (704, 706, 708, . . . , 710). Alternatively, the selector component 712 can provide an output result that indicates that the entity mention does not correspond to any known entity, e.g., if none of the scores exceeds an environment specific threshold value. By performing this selection function, the selector component 712 provides a conclusion as to what entity the entity mention most likely corresponds. That entity corresponds to whatever entity in the ontology under consideration matches the entity mention in the input item (which has already been determined).

Consider the following example. Assume that an input document contains a sentence that includes just one entity mention: "Era." As previously set forth, that entity mention can either refer to a gene ("estrogen receptor 1") or a disease ("enthesitis-related arthritis"). Assume, as stated above, that the first type-specific linking component 704 is associated with the entity type of genes, while the second type-specific linking component 706 is associated with the entity type of diseases.

In that circumstance, the first type-specific linking component 704 can map the input sentence (which contains "Era") to a first score. That first score identifies the probability that the entity mention corresponds to a gene. The second type-specific linking component 706 maps the same input sentence to a second score. That second score identifies the probability that the entity mention corresponds to a disease. Note that, in this first model architecture, each type-specific linking component performs its classification independent on the other type-specific linking components.

Assume that the selector component 712 determines that the type-specific linking component 704 for genes has the highest score, and, furthermore, this score is above the environment-specific threshold value. The selector component 712 will then provide an output result that indicates that the entity mention most likely correspond to "estrogen receptor 1" within the gene database (because that is the entity identifier that matches "Era"). That is, the type-specific linking component 704 has already determined that the entity mention "Era" corresponds to "estrogen receptor 1" by virtue of its previous lookup operation (e.g., in the course of determining that the input sentence contains an entity mention).

Note that the linking component 702, without modification, does not handle the case in which an entity mention maps to two or more entities within the same entity type, e.g., by identifying two distinct genes in the gene ontology, or by identifying two distinct diseases in the disease ontology. In the rare occasions in which this does happen, the linking component 108 can flag an error. The linking component 108 can then either report an error result, or can delegate the handling of this case to another component.

In some circumstances, an entity mention only maps to a reference term in a single ontology, such as genes. In this circumstance, the appropriate type-specific linking component can provide a score associated with this entity type (that is, genes). The score allows the selector component 712 to determine whether the association between the entity mention and the entity type is reliable or not, e.g., based on whether the score exceeds the environment-specific threshold value. The linking component 108 can also optionally generate other scores using other type-specific linking components. For example, although a term in a document does not map to a reference term in a drugs-related ontology, a drug-specific linking component can nevertheless be applied to generate a score. A high score from the drug-specific linking component may suggest that the document term actually describes a drug, although the drug-related ontology does not currently contain the entity-identifier associated with this term. Although incomplete, this conclusion provides insight that can be used in subsequent processing operations. It can also serve as a cue for an administrator to update the drugs-related ontology.

In one case, the training framework 104 can separately train a machine-learned model for each of the type-specific linking components (704, 706, 708, . . . , 710). As described, each such type-specific linking component corresponds to a binary classifier that provides a score reflecting the probability that an identified entity mention corresponds to particular entity type.

Figure 8:
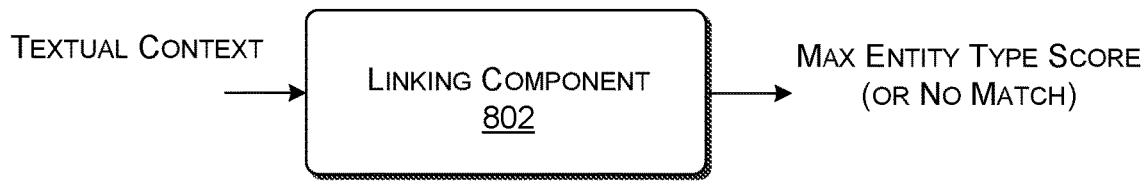
FIG. 8 shows a second general architecture of a linking component.

FIG. 8 shows a second general architecture of a linking component 802, corresponding to another implementation of the linking component 108 described above. In this version, a single linking component 802 performs the same preliminary task of receiving an input item and determining whether the input item contains at least one term that matches a reference term in any of the ontologies. If it does, the linking component 108 generates a textual context in which the thus-identified entity mention occurs in the input item. The linking component 802 then maps the textual context to an output result. The output result identifies the entity type to which the entity most likely corresponds. For example, each ontology can be assigned a unique designator item. The linking component 108 of FIG. 8 can be trained to map a textual context to one of the designator items associated with a corresponding winning ontology.

In other words, the linking component 802 of FIG. 8 can operate as a one-to-many classifier that includes internal logic that duplicates the operations performed by the linking component 702 of FIG. 7. In addition, the linking component 802 of FIG. 8 can generate an internal score for each particular ontology that takes into account the processing operations that contribute to the scores associated with the other ontologies. In a neural network implementation, this cross-influencing aspect is implicitly captured by learned weighting values associated with the model.

Figure 9:
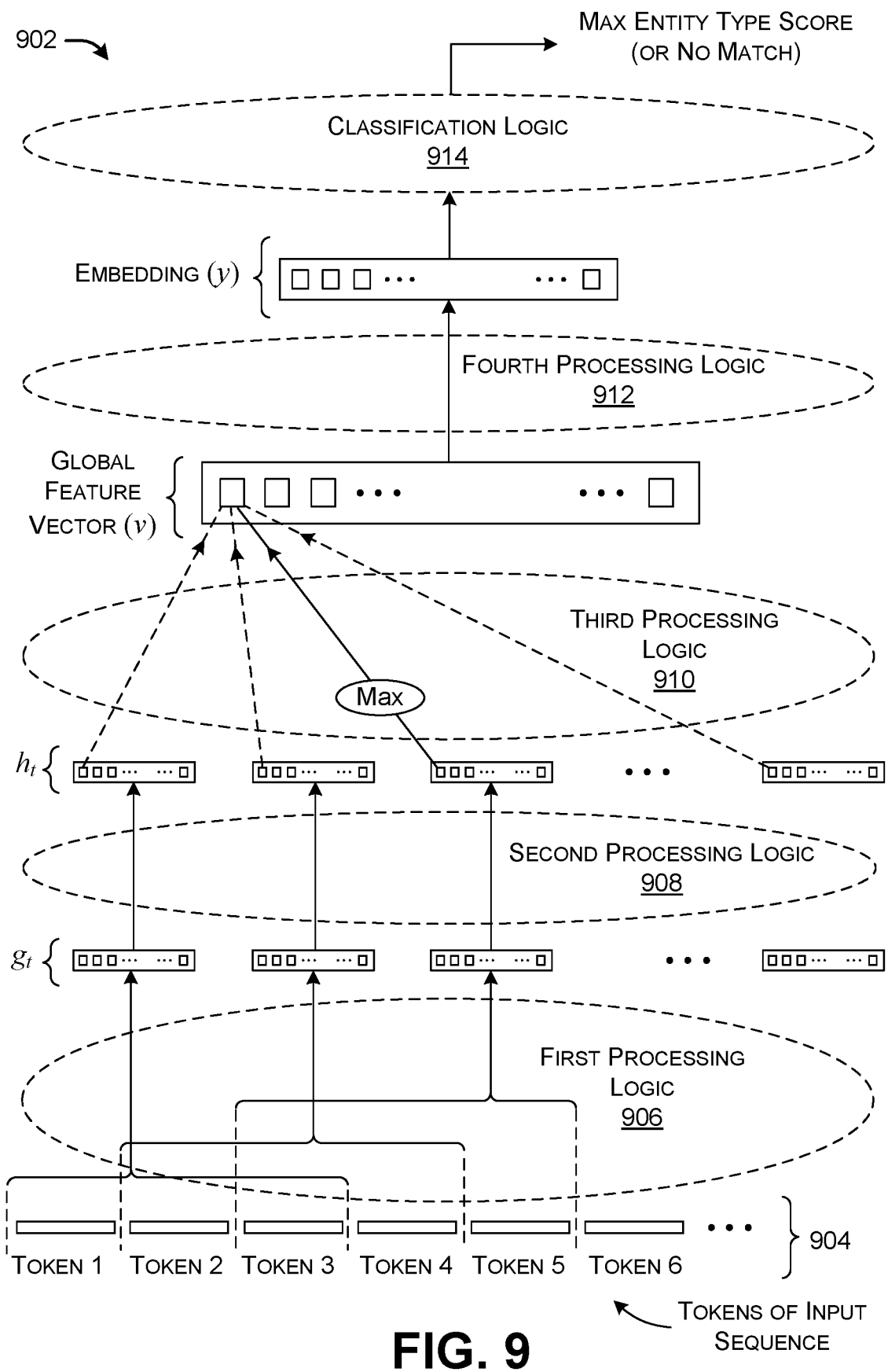
FIG. 9 shows a convolutional neural network that can be used to implement a linking component.

Advancing to FIG. 9, this figure shows a convolutional neural network (CNN) 902 that can be used to implement the linking component 108, e.g., corresponding to the architecture of FIG. 7 or the architecture of FIG. 8. That is, in one implementation, the CNN 902 can be trained to implement one of the individual type-specific linking components (704, 706, 708, . . . , 710) of FIG. 7. In another implementation, the CNN 902 can be trained to implement the global linking component 802 of FIG. 8.

The following explanation will set forth one particular manner of operation of the CNN 902. This explanation is set forth in the spirit of illustration, not limitation; other implementations can vary any aspect of this CNN 902, including its neural network architecture (such as the number of layers it uses, the behavior of those layers, etc.).

Assume that preliminary processing functionality (not shown) of the linking component of which the CNN 902 is a part has already performed a lookup operation to determine that an input sentence under consideration includes an entity mention that maps to one or more ontologies. For example, the input sentence can correspond, in part, to the text that reads, "The initial results confirm that Era plays a role in osteoporosis, endometrial cancer, and breast cancer." In this sentence, "Era" corresponds to a first entity mention. The terms "osteoporosis," "endometrial cancer," and "breast cancer" are three other entity mentions. Assume that the goal in this example is to determine whether "Era" refers to a gene or a disease. The preliminary processing functionality forms an input sequence 904 that includes n words preceding the entity mention, and n words following entity mention. For n=5, the preliminary processing functionality can prepare the input sequence 904 that reads "The initial results confirm that X plays a role in osteoporosis." Here, the preliminary processing functionality may substitute a dummy token (e.g., "X") for the actual entity mention.

As a first operation, first processing logic 906 produces a series of input vectors, each denoted by $g_t$. The first processing logic 906 can perform this operation in different ways. Assume that each vector $g_t$ represents a word-trigram. A word-trigram includes three consecutive words in the input sequence 904. But other implementations can generate vectors using word-based n-grams for any value of n.

In a first approach, the first processing logic 906 appends special tags (e.g., the tag <s>) to the start and end of the input sequence 904, e.g., by forming the sequence, "<s> The initial results confirm that X plays a role in osteoporosis <s>." The first processing logic 906 can then express each word in the thus-formed sequence as a letter-trigram vector. The first processing logic 906 performs this task by moving a three-letter window across each word. For example, the first processing logic 906 can express the word "confirm" as a letter-trigram vector which specifies the presence of the following letter-trigrams: "con," "onf," "nfi," "fir," and "irm." That is, the vector has a dimensionality equal to the number of possible three-letter combinations in a natural language. The first processing logic 906 forms the letter-trigram vector by setting the slots associated with each of the three-letter combinations that are present in the word to "1," and the remaining slots to "0."

The first processing logic 906 then forms word-trigram vectors from the letter-trigram vectors by moving a three-word window across the input sequence 904 as a whole. For example, the first processing logic 906 can form word-trigram vectors for the following combinations of words: "<s> The initial," "The initial results," "initial results confirm," and so on. More specifically, the first processing logic 906 can form each such word-trigram vector $g_t$ by concatenating (or adding) the three letter-trigram vectors associated with a corresponding three-word window. For example, the first processing logic 906 can form the word-trigram vector for the three-word window "The initial results" by concatenating the letter-trigram vectors of "The," "initial," and "results."

In a second approach, the first processing logic 906 forms each word-trigram vector $g_t$ based on a consideration of unique words in a window, without first forming letter-trigram vectors. For example, the word-trigram vector may have a dimensionality equal to a total number of the most commonly occurring word-unigrams (single words), word-bigrams (two-word combinations), and word-trigrams (three-word combinations) in a natural language, with each slot of that vector associated with a particular word combination. The first processing logic 906 can set a value m for each slot that identifies the number of times a word combination associated with that slot appears in the three-word window. For example, the first processing logic 906 can form a word-trigram vector for the three-word window "initial results confirm" by: (1) setting a "1" entry in the three slots associated with the respective single words "initial," "results," and "confirm"; (2) setting a "1" entry for the two-word combination "initial result," etc.; and (3) setting a "1" entry for the three-word combination "initial results confirm," etc.

In a third approach, the first processing logic 906 maps any initial vector representation of the three words in the three-word window to a low-dimensioned word-trigram vector $g_t$, e.g., using any machine-learned model, such as a neural network.

Next, second processing logic 908 transforms each word-trigram vector $g_t$ into a local contextual feature (LCF) vector ($h_t$). It does so using a machine-learned matrix $W_c$, referred to herein as a convolution matrix. This operation yields a series of local contextual feature (LCF) vectors. More specifically, the second processing logic 908 may compute a particular LCF vector $h_t$ as:

$$h_t = \tan h(W_c \cdot g_t) \qquad (2).$$

In a next phase of operation, third processing logic 910 forms a single global feature vector v by pulling respective maximum values from the LCF vectors. More specifically, consider the first element of the global feature vector v, corresponding to the first dimension of that vector. The third processing logic 910 identifies the values expressed by the corresponding first elements of the LCF vectors, and then selects the maximum value among those values. The third processing logic 910 then inserts that maximum value into the first element of the global feature vector v.

Fourth processing logic 912 projects the global feature vector v into a continuous-valued concept vector y using a machine-learned semantic projection matrix $W_s$. More specifically, the fourth processing logic 912 may generate the vector y using the following equation:

$$y = \tan h(W_s \cdot v) \qquad (3).$$

Classification logic 914 can use any type of trained classier to map the concept vector y into a final output result. For example, classification logic 914 can correspond to another feed-forward neural network, a logistic regression model, etc. In the context of FIG. 7, that final score reflects a likelihood that the entity mention "Era" correspond to a particular entity type associated with the CNN 902, such as a gene entity type. In the context of FIG. 8, the final score may specify an entity type among a plurality of possible entity types.

Figure 10:
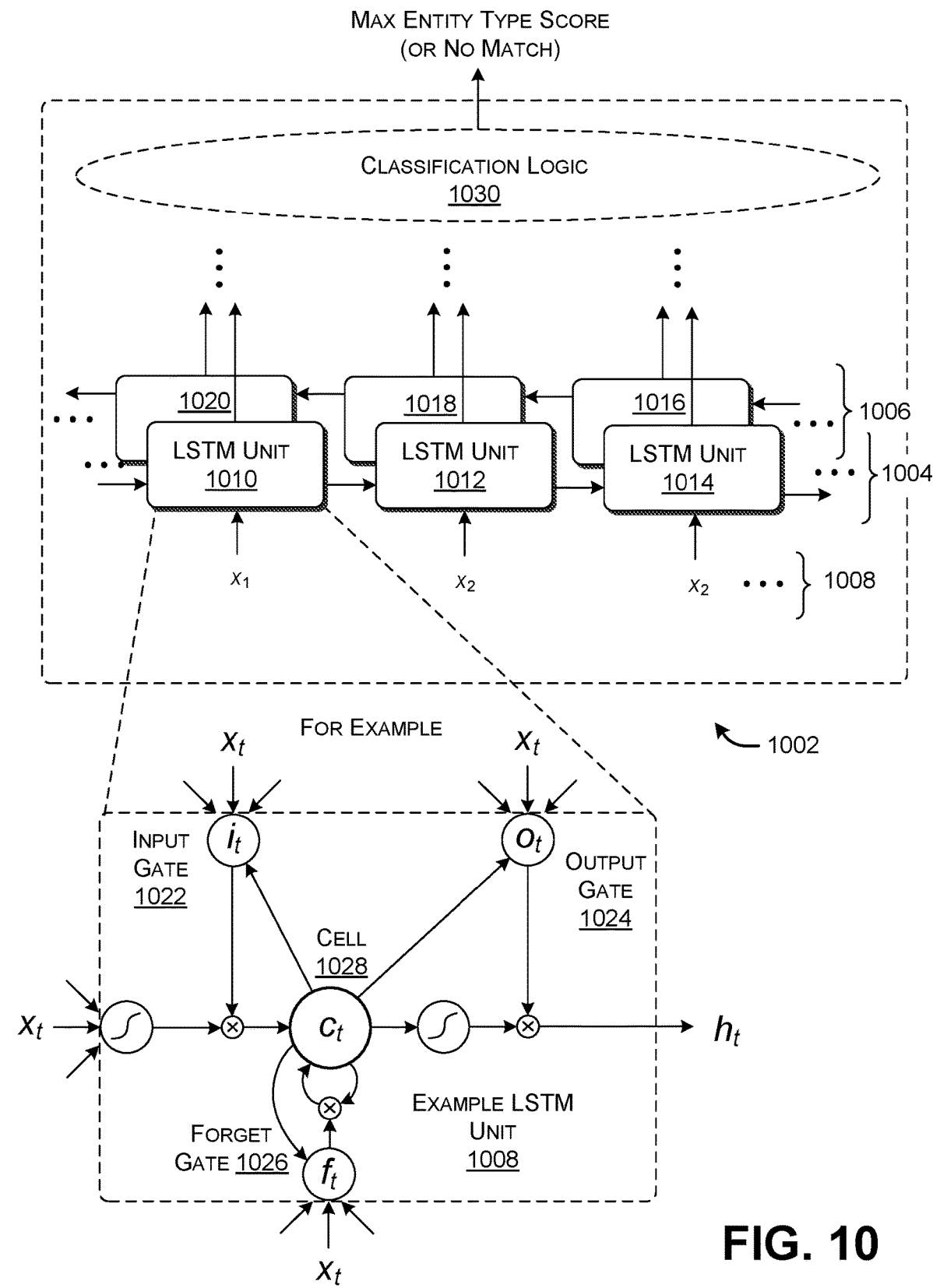
FIG. 10 shows a recursive neural network that can be used to implement a linking component.

Advancing to FIG. 10, this figure shows a recursive neural network (RNN) 1002 that can implement the linking component 108. In one implementation, the RNN 1002 can be trained to implement one of the individual type-specific linking components (704, 706, 708, . . . 710) of FIG. 7. In another implementation, the RNN 1002 can be trained to implement the global linking component 802 of FIG. 8

The particular variant of the RNN 1002 shown in FIG. 10 includes a bidirectional series of processing units, e.g., including a first chain 1004 of processing units that pass hidden vector information from left to right, and a second chain 1006 of processing units that pass hidden vector information from right to left.

Each processing unit can have any internal processing architecture. In one implementation, each processing unit corresponds to a Long Short-Term Memory (LSTM) unit, or a Gated Recurrent Unit (GRU), or some other neural network unit. General background information regarding the isolated topic of LSTM architecture can be found in Alex Graves, "Generating Sequences With Recurrent Neural Networks," in arXiv:1308.0850v5 [cs.NE], Jun. 5, 2014, 43 pages. General background information regarding the isolated topic of GRU architecture can be found in Chung, et al., "Empirical Evaluation of Gated Recurrent Neural Networks on Sequence Modeling," in arXiv:1412.3555v1 [cs.NE], Dec. 11, 2014, 9 pages.

Assume that that the RNN 1002 is assigned the task of processing the same input sequence 904 described above, that is, "The initial results confirm that X plays a role in osteoporosis." Preliminary processing functionality (not shown) can convert each token (e.g., each word) of this input sequence into vector form in any manner. For example, the preliminary processing functionality can represent each word as a one-hot vector (in which each slot of the vector corresponds to a particular word in a natural language), or in letter-trigram form (as described above in connection with FIG. 9). Alternatively, the preliminary processing functionality can use any machine-trained model to map an initial vector representation of each word (such as a one-hot representation) into a low-dimensionality vector in semantic space. For example, the preliminary processing functionality can use a neural network to perform this task. In any event, the symbol $x_t$ refers to an input vector associated with each word in a series of input vectors 1008.

FIG. 10 shows the non-limiting example in which the processing units correspond to LSTM units. That is, the first chain 1004 of processing units includes at least LSTM unit 1010, LSTM unit 1012, LSTM unit 1014, etc. The second chain 1006 of processing units includes at least LSTM unit 1016, LSTM unit 1018, LSTM unit 1020, etc.

The RNN 1002 feeds each input vector $x_t$ into appropriate LSTM units along the chains (1004, 1006). For example, the RNN 1002 can feed a first vector $x_1$ to LSTM units 1010 and 1020, a second vector $x_2$ to LSTM units 1012 and 1018, and so on. Note that the RNN 1002 will dynamically adapt the lengths of the chains (1004, 1006) to accommodate the length of the input sequence.

Each LSTM can process its input vector in the manner described below, to generate a hidden state vector. Each LSTM unit also performs its computation based on the hidden state vector provided by a preceding LSTM vector in its chain. For instance, the LSTM unit 1012 performs its computations based on the hidden state vector generated by the LSTM unit 1010, together with the input vector $x_2$.

Without limitation, FIG. 10 also shows the architecture of one of the LSTM units, namely LSTM unit 1010. The LSTM unit 1010 includes an input gate 1022, an output gate 1024, a forget gate 1026, and a cell 1028. The LSTM unit 1010 processes signals in a manner specified by the following equations:

$$i_t = \sigma(W_{xi}x_t + W_{hi}h_{t-1} + W_{ci}c_{t-1} + b_i) \quad (4)$$

$$f_t = \sigma(W_{xf}x_t + W_{hf}h_{t-1} + W_{cf}c_{t-1} + b_f) \quad (5)$$

$$c_t = f_t c_{t-1} + i_t \tan h(W_{xc}x_t + W_{hc}h_{t-1} + b_c) \quad (6)$$

$$o_t = \sigma(W_{xo}x_t + W_{ho}h_{t-1} + W_{co}c_t b_o) \quad (7)$$

$$h_t = o_t \tan h(c_t) \quad (8).$$

In this set of equations, t refers to current processing instance, x refers to a vector that represents a token of the input sequence, and i, o, f, and c represent vectors associated with the input gate 1022, the output gate 1024, the forget gate 1026, and the cell 1028, respectively. h represents a hidden state vector associated with the hidden state. σ represents a logistic sigmoid function. The various weighting terms (W) and bias terms (b) symbols represent sets of machine-learned weighting parameter values, with subscripts associated with the above-defined symbols.

Classification logic 1030 can map one or more of the hidden vectors into a classification result. For example, assume that the entity mention of interest ("Era") occurs at the sixth position within the input sequence. That entity mention's corresponding input vector is thus $x_6$. The two LSTM units (from the first chain 1004 and second chain 1006, respectively) that process this input vector generate two respective hidden state vectors. The classification logic 1030 can concatenate (or add together) these two hidden state vectors, and then map the result to a classification result. The classification logic 1030 can correspond to any machine-trained model, such as a feed-forward neural network, a logistic regression model, etc.

Note that FIGS. 9 and 10 show just two of a variety of machine-learned models that can be used to implement the linking component 108. In yet another case, the linking component 108 can be implementing using a logistic regression model by itself.

B. Illustrative Processes

FIGS. 11-14 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 11 is a process 1102 that shows an overview of one manner of operation of the system 102 of FIG. 1. In block 1104, the generating component 112 of the training framework 104 generates a set of initial training examples by matching corpus terms in a text corpus with reference terms specified in one or more ontologies. Each initial training example identifies: an entity mention, corresponding to a corpus term that matches an associated reference term in an ontology; an entity identifier associated with the entity mention which uniquely identifies a particular entity in the ontology; and a textual context in which the entity mention appears in the text corpus. In block 1106, the filtering component 118 removes noise in the set of initial training examples by discounting initial training examples based on one or more filtering rules stored in a data store, to produce a set of filtered training examples. In block 1108, the training component 124 trains a linking component using a computer-implemented machine-learning process, based, in part, on the set of filtered training examples. In block 1110, the training component 124 transfers the linking component 108 to the application framework 106 for use within the application framework 106. In block 1112, in the application framework 106, the linking component 108 receives an input entity mention. In block 1114, the linking component 108 maps the input entity mention to a corresponding entity identifier, the corresponding entity identifier uniquely identifying a particular entity in an ontology.

FIG. 12 is a process 1202 that shows one manner of operation of the search system 126 of FIG. 4. In block 1204, the search system 126 receives an input item and at least one original candidate document, each original candidate document including zero, one, or more entity mentions. In block 1206, the search system 126 uses the linking component 108 to map each entity mention in the original candidate document(s) to a corresponding entity identifier, to produce at least one entity-mapped candidate document. In block 1208, the search system 126 compares the input item with the entity-mapped candidate document(s), to provide a match result. In block 1210, the search system 126 provides the match result to a user.

FIG. 13 is a process 1302 that shows one manner of operation of the document creation system 128 of FIG. 5. In block 1304, the document creation system 128 receives an input item from the user, in a course creating a new document by the user. In block 1306, the document creation system 128 uses the linking component 108 to map each entity mention in the input item to a corresponding entity identifier, to produce an entity-mapped input item. In bock 1308, the document creation system 128 optionally replaces each entity mention with a canonical term associated that entity mention's entity identifier.

Figure 14:
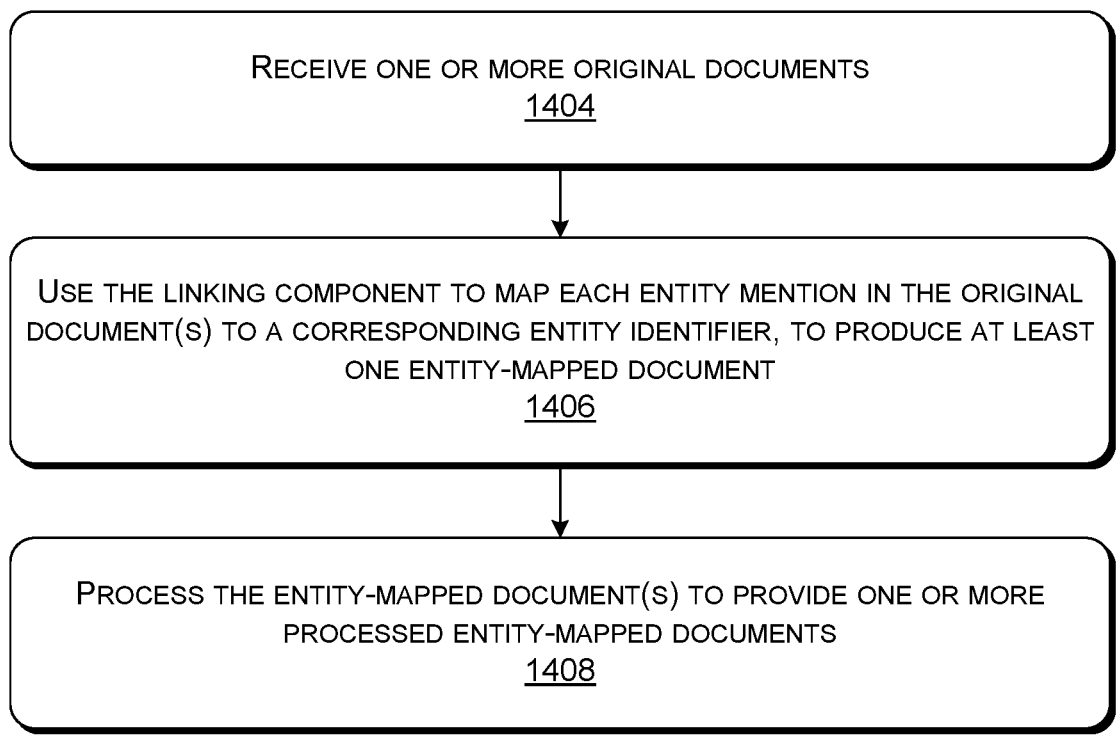
FIG. 14 is a flowchart that shows one manner of operation of the document processing system of FIG. 6.

FIG. 14 is a process 1402 that shows one manner of operation of the document processing system 130 of FIG. 6. In block 1404, the document processing system 130 receives one or more original documents. In block 1406, the document processing system 130 uses the linking component 108 to map each entity mention in the original document(s) to a corresponding entity identifier, to produce at least one entity-mapped document. In block 1408, the document processing system 130 processes the entity-mapped document(s) to produce one or more processed entity-mapped documents. Block 1408 can encompass such operations as document grouping (clustering), relation extraction, etc.

C. Representative Computing Functionality

Figure 15:
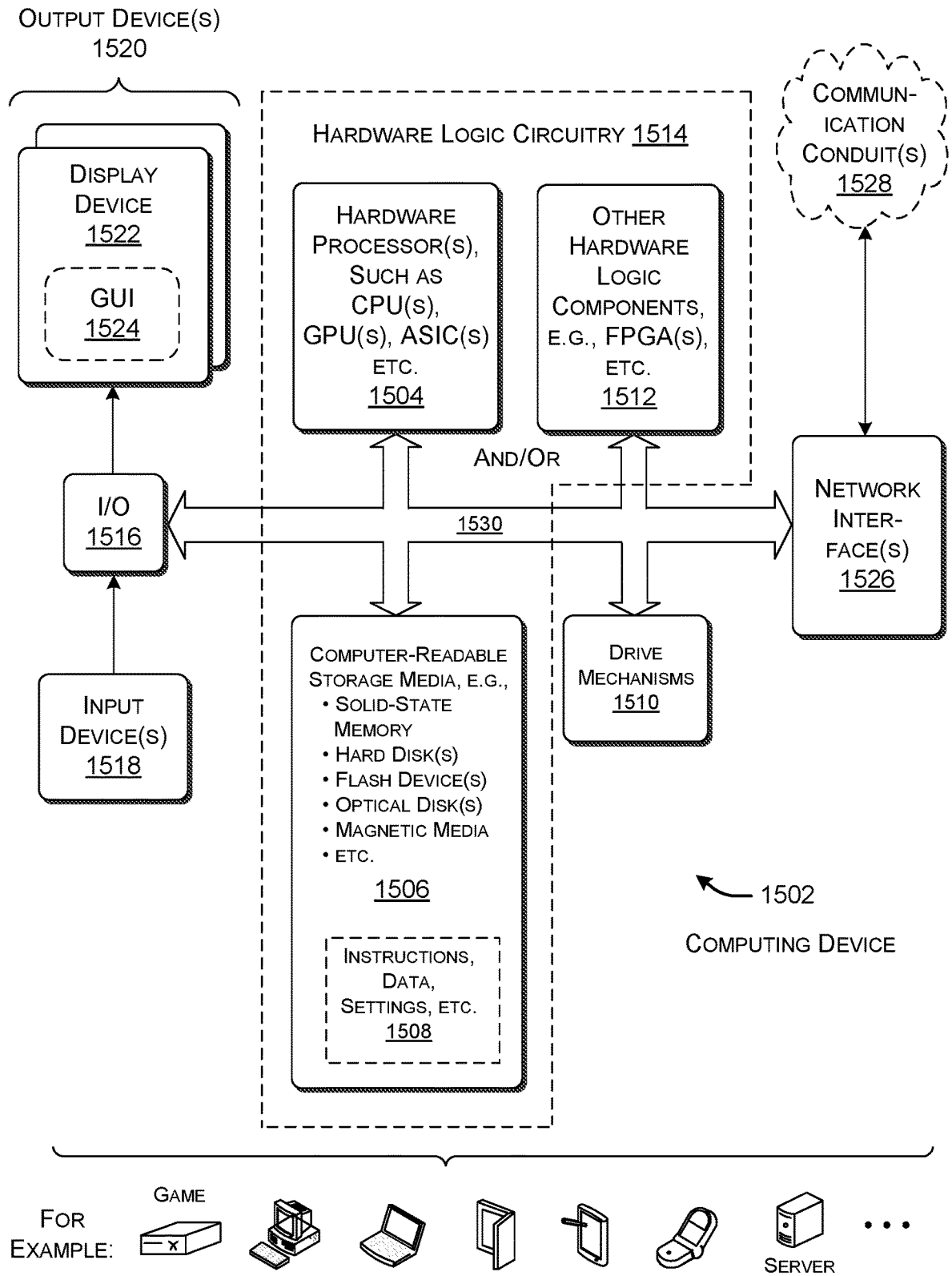
FIG. 15 shows an illustrative type of computing device that can be used to implement any aspect of the features shown in the foregoing drawings.

FIG. 15 shows a type of computing device 1502 that can be used to implement any aspect of the mechanisms set forth in the above-described figures. For instance, the type of type of computing device 1502 shown in FIG. 15 can be used to implement any remote server or local computing device shown in FIG. 3. In all cases, the computing device 1502 represents one or more physical and tangible processing mechanisms.

The computing device 1502 can include one or more hardware processors 1504. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1502 can also include computer-readable storage media 1506, corresponding to one or more computer-readable media hardware units. The computer-readable storage media 1506 retains any kind of information 1508, such as machine-readable instructions, settings, data, etc. Without limitation, for instance, the computer-readable storage media 1506 may include one or more solid-state devices, one or more magnetic hard disks, one or more optical disks, magnetic tape, and so on. Any instance of the computer-readable storage media 1506 can use any technology for storing and retrieving information. Further, any instance of the computer-readable storage media 1506 may represent a fixed or removable component of the computing device 1502. Further, any instance of the computer-readable storage media 1506 may provide volatile or non-volatile retention of information.

The computing device 1502 can utilize any instance of the computer-readable storage media 1506 in different ways. For example, any instance of the computer-readable storage media 1506 may represent a hardware memory unit (such as Random Access Memory (RAM)) for storing transient information during execution of a program by the computing device 1502, and/or a hardware storage unit (such as a hard disk) for retaining/archiving information on a more permanent basis. In the latter case, the computing device 1502 also includes one or more drive mechanisms 1510 (such as a hard drive mechanism) for storing and retrieving information from an instance of the computer-readable storage media 1506.

The computing device 1502 may perform any of the functions described above when the hardware processor(s) 1504 carry out computer-readable instructions stored in any instance of the computer-readable storage media 1506. For instance, the computing device 1502 may carry out computer-readable instructions to perform each block of the processes described in Section B.

Alternatively, or in addition, the computing device 1502 may rely on one or more other hardware logic components 1512 to perform operations using a task-specific collection of logic gates. For instance, the hardware logic component(s) 1512 may include a fixed configuration of hardware logic gates, e.g., that are created and set at the time of manufacture, and thereafter unalterable. Alternatively, or in addition, the other hardware logic component(s) 1512 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 15 generally indicates that hardware logic circuitry 1514 corresponds to any combination of the hardware processor(s) 1504, the computer-readable storage media 1506, and/or the other hardware logic component(s) 1512. That is, the computing device 1502 can employ any combination of the hardware processor(s) 1504 that execute machine-readable instructions provided in the computer-readable storage media 1506, and/or one or more other hardware logic component(s) 1512 that perform operations using a fixed and/or programmable collection of hardware logic gates.

In some cases (e.g., in the case in which the computing device 1502 represents a user computing device), the computing device 1502 also includes an input/output interface 1516 for receiving various inputs (via input devices 1518), and for providing various outputs (via output devices 1520). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1522 and an associated graphical user interface presentation (GUI) 1524. The display device 1522 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1502 can also include one or more network interfaces 1526 for exchanging data with other devices via one or more communication conduits 1528. One or more communication buses 1530 communicatively couple the above-described components together.

The communication conduit(s) 1528 can be implemented in any manner, e.g., by a local area computer network, a wide area computer network (e.g., the Internet), point-to-point connections, etc., or any combination thereof. The communication conduit(s) 1528 can include any combination of hardwired links, wireless links, routers, gateway functionality, name servers, etc., governed by any protocol or combination of protocols.

FIG. 15 shows the computing device 1502 as being composed of a discrete collection of separate units. In some cases, the collection of units may correspond to discrete hardware units provided in a computing device chassis having any form factor. FIG. 15 shows illustrative form factors in its bottom portion. In other cases, the computing device 1502 can include a hardware logic component that integrates the functions of two or more of the units shown in FIG. 1. For instance, the computing device 1502 can include a system on a chip (SoC or SOC), corresponding to an integrated circuit that combines the functions of two or more of the units shown in FIG. 15.

The following summary provides a non-exhaustive list of illustrative aspects of the technology set forth herein.

According to a first aspect, a system for processing electronic documents is described. The system includes a training framework, implemented by one or more computing devices, for training a linking component using distant supervision. The training framework includes a generating component configured to generate a set of initial training examples by matching corpus terms in a text corpus with reference terms specified in one or more ontologies, each initial training example identifying: an entity mention, corresponding to a corpus term that matches an associated reference term in an ontology; an entity identifier associated with the entity mention which uniquely identifies a particular entity in the ontology; and a textual context in which the entity mention appears in the text corpus. The training framework also includes: a filtering component configured to remove noise in the set of initial training examples by discounting initial training examples based on one or more filtering rules stored in a data store, to produce a set of filtered training examples; and a training component configured to train the linking component using a computer-implemented machine-learning process, based, in part, on the set of filtered training examples.

The system of the first aspect also includes an application framework implemented by one or more computing devices, which includes one or more application systems, including a search system. The search system includes: an interface component configured to receive an input item and at least one original candidate document, each original candidate document including zero, one, or more entity mentions; the above-mentioned linking component, the linking component being configured to map each entity mention in the original candidate document(s) to a corresponding entity identifier, to produce at least one entity-mapped candidate document; and a matching component configured to compare the input item with the one entity-mapped candidate document(s), to provide a match result. The interface component is further configured to provide the match result to a user.

Each component of the training framework, and each application system, is implemented by hardware logic circuitry, the hardware logic circuitry corresponding to: (a) one or more hardware processors that execute machine-readable instructions stored in a memory, and/or by (b) one or more other hardware logic components that perform operations using a task-specific collection of logic gates.

According to a second aspect, the filtering component is configured to process an initial training example using at least one filtering criterion that depends on an entity type associated the initial training example.

According to a third aspect, the filtering component is configured to discount an initial training example that is associated with an entity mention having a character length below a prescribed character length.

According to a fourth aspect, the filtering component is configured to discount an initial training example that has an entity mention that maps to two or more ontologies.

According to a fifth aspect, the filtering component is configured to promote an initial training example having a textual context that includes two or more different entity mentions that are associated with a same entity identifier.

According to a sixth aspect, the training component is configured to produce the linking component by using only: (1) name-related information provided in the ontology(ies); and (2) the text corpus.

According to a seventh aspect, the text corpus corresponds to a first domain, and wherein the application framework applies the linking component to entity mentions associated with a second domain, and wherein the first domain does not match the second domain.

According to an eighth aspect, the linking component is configured to provide an output result that specifies an ontology, among a collection of ontologies, that is most likely to contain an entity identifier associated with an input entity mention.

According to a ninth aspect, the input item is an input reference document.

According to a tenth aspect, the input reference document (mentioned in the ninth aspect) is a patient-related medical record, and wherein the original candidate document(s) corresponds to one or more documents describing respective clinical trials.

According to an eleventh aspect, the input item corresponds to a targeted input query.

According to a twelfth aspect, the linking component of the search system is further configured to map at least one entity mention in the input item to at least one corresponding entity identifier, to produce an entity-mapped input item.

According to a thirteenth aspect, another application system is a document creation system. The document creation system includes: a document creation component configured to receive an input item from the user, in a course of creating a new document by the user; and the aforementioned linking component, the linking component being configured to map each entity mention in the input item received by the document creation component to a corresponding entity identifier, to produce an entity-mapped input item.

According to a fourteenth aspect, a method is described for training a linking component using a training framework implemented by one or more computing devices. The method includes generating a set of initial training examples by matching corpus terms in a text corpus with reference terms specified in one or more ontologies. Each initial training example identifies: an entity mention, corresponding to a corpus term that matches an associated reference term in an ontology; an entity identifier associated with the entity mention which uniquely identifies a particular entity in the ontology; and a textual context in which the entity mention appears in the text corpus. The method also includes: removing noise in the set of initial training examples by discounting initial training examples based on one or more filtering rules stored in a data store, to produce a set of filtered training examples; training a linking component using a computer-implemented machine-learning process, based, in part, on the set of filtered training examples; and transferring the linking component to an application framework for use within the application framework.

According to a fifteenth aspect, the method also includes, in an application framework implemented by one or more computing devices: receiving an input item and at least one original candidate document, each original candidate document including zero, one, or more entity mentions; using the linking component to map each entity mention in the original candidate document(s) to a corresponding entity identifier, to produce at least one entity-mapped candidate document; comparing the input item with the entity-mapped candidate document(s), to provide a match result; and providing the match result to a user.

According to a sixteenth aspect, the input item mentioned in the fifteenth aspect is a patient-related medical record, and wherein the original candidate document(s) corresponds to one or more documents describing respective clinical trials.

According to a seventeenth aspect, the input item mentioned in the fifteenth aspect corresponds to a targeted input query.

According to an eighteenth aspect, a linking component is described that is produced in accordance with the method of the fourteenth aspect.

According to a nineteenth aspect, a computer-readable storage medium for storing computer-readable instructions is described. The computer-readable instructions, when executed by one or more hardware processors, perform a method that includes: receiving an input entity mention; and using a linking component to map the input entity mention to a corresponding entity identifier, the corresponding entity identifier uniquely identifying a particular entity in an ontology. The linking component is produced in a training phase, the training phase involving: generating a set of initial training examples by matching corpus terms in a text corpus with reference terms specified in one or more ontologies; removing noise in the set of initial training examples by discounting initial training examples based on one or more filtering rules stored in a data store, to produce a set of filtered training examples; and training the linking component using a computer-implemented machine-learning process, based, in part, on the set of filtered training examples.

According to a twentieth aspect, the linking component mentioned in the nineteenth aspect provides an output result that specifies the ontology, among a collection of ontologies, as a source that is most likely to contain the entity identifier associated with the input entity mention.

According to a twenty-first aspect, the input entity mention mentioned in the nineteenth aspect appears in a first content item, and wherein the method further includes using the corresponding entity identifier to match the first content item to another content item that is associated with the same corresponding entity identifier.

A twenty-second aspect corresponds to any combination (e.g., any permutation or subset that is not logically inconsistent) of the above-referenced first through twenty-first aspects.

A twenty-third aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-second aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for performing and applying machine learning, comprising:
   hardware logic circuitry including: (a) one or more hardware processors that perform operations by executing machine-readable instructions stored in a memory, and/or (b) one or more other hardware logic units that perform the operations using a task-specific collection of logic gates, the operations including:
   generating a set of initial training examples by matching corpus terms in a text corpus with reference terms specified in one or more ontologies, each ontology being a dictionary resource, provided in a dictionary resource data store, that identifies a set of entities pertaining to a prescribed subject matter domain, each initial training example identifying:
   an entity mention, corresponding to a corpus term that matches an associated reference term in an ontology;

an entity identifier associated with the entity mention which uniquely identifies a particular entity in the ontology; and a textual context in which the entity mention appears in the text corpus;

removing noise in the set of initial training examples by discounting initial training examples based on one or more filtering rules stored in a rules data store, to produce a set of filtered training examples;

training at least one machine-trained model using a computer-implemented machine-learning process by iteratively generating a set of parameter values, based, in part, on the set of filtered training examples;

after said at least one machine-trained model has been trained, determining that a particular input item term matches a particular reference term in a particular ontology, the particular reference term corresponding to a particular entity mention, the particular ontology being a particular dictionary resource, provided in a particular dictionary resource data store, that identifies a set of entities pertaining to a prescribed subject matter domain and a particular entity type, said determining identifying the particular entity mention by searching the particular dictionary resource;

after searching the dictionary resource, forming an input sequence that includes a set of words preceding the particular entity mention and a set of words following the particular entity mention; and applying said at least one machine-trained model that has been trained to generate a score for the particular entity mention by using the parameter values of the machine-trained model to map the input sequence into the score, the score reflecting a probability that the particular input item term is a correct match for the particular reference term in the particular ontology.

2. The system of claim 1, wherein said filtering is configured to process a particular initial training example using at least one filtering criterion that depends on an entity type associated with the initial training example.

3. The system of claim 1, wherein said filtering is configured to discount a particular initial training example that is associated with an entity mention having a character length below a prescribed character length.

4. The system of claim 1, wherein said filtering is configured to discount a particular initial training example that has an entity mention that maps to two or more ontologies.

5. The system of claim 1, wherein said filtering is configured to promote a particular initial training example having a textual context that includes two or more different entity mentions that are associated with a same entity identifier.

6. The system of claim 1, wherein said at least one machine-trained model includes a plurality of separately-trained machine-trained models dedicated to plural respective ontologies and which operate as respective independent binary classifiers, the hardware logic circuitry being configured to independently apply each of the plurality of machine-trained models to map the input sequence into an ontology-specific score that identifies a likelihood of a match between the particular input item term and an entry in an associated ontology.

7. The system of claim 1, wherein said at least one machine-trained model includes a machine-trained model that identifies a specific ontology, among a plurality of ontologies, having an entry that is most likely to match the particular input item term.

8. A method, implemented by one or more computing devices, for applying machine learning, comprising:

receiving an input item that includes one or more input item terms;

determining that a particular input item term matches a particular reference term in a particular ontology, the particular reference term corresponding to a particular entity mention, the particular ontology being a dictionary resource, provided in a dictionary resource data store, that identifies a set of entities pertaining to a prescribed subject matter domain and a particular entity type, said determining identifying the particular entity mention by searching the dictionary resource;

after searching the dictionary resource, forming an input sequence that includes a set of words preceding the particular entity mention and a set of words following the particular entity mention; and applying a machine-trained model that has been trained to generate a score for the particular entity mention by using parameter values of the machine-trained model to map the input sequence into the score, the score reflecting a probability that the particular input item term is a correct match for the particular reference term in the particular ontology.

9. The method of claim 8, wherein the machine-trained model is produced in a training phase, the training phase involving:

generating a set of initial training examples by matching corpus terms in a text corpus with reference terms specified in one or more ontologies;

removing noise in the set of initial training examples by discounting initial training examples based on one or more filtering rules stored in a rules data store, to produce a set of filtered training examples; and producing the machine-trained model using a computer-implemented machine-learning process by iteratively generating the parameter values, based, in part, on the set of filtered training examples.

10. The method of claim 8, wherein the particular reference term is associated with a particular entity identifier that uniquely identifies an entity to which the particular reference term corresponds, and wherein the method further includes using the particular entity identifier to identify a matching content item that is also associated with the particular entity identifier.

11. The method of claim 8, wherein the particular reference term is associated with a particular entity identifier that uniquely identifies an entity to which the particular reference term corresponds, wherein the particular input item term appears in a document being created by a user, and wherein the method further includes replacing the particular input item term with another term associated with the particular entity identifier.

12. The method of claim 8, wherein the machine-trained model is one of a plurality of separately-trained machine-trained models that operate as respective independent binary classifiers, each of the plurality of machine-trained models being dedicated to a corresponding ontology and a corresponding entity type, and wherein the method further includes independently performing said determining and applying for each of the plurality of machine-trained models to generate a plurality of ontology-specific scores.

13. The method of claim 12, wherein the method further includes:

identifying a particular machine-trained model among the plurality of machine-trained models that yields a score having a greatest confidence, the particular machine-trained model being associated with a specific ontology, and associating the particular input item term with an entity identifier retrieved from the specific ontology.

14. The method of claim 8, wherein the machine-trained model identifies a specific ontology, among a plurality of ontologies, having an entry that is most likely to match the particular input item term.

15. The method of claim 10, wherein the input item is a patient-related medical record, and wherein the matching content item corresponds to one or more documents describing respective clinical trials.

16. The method of claim 10, wherein the input item corresponds to a targeted input query, and wherein the matching content item is a document identified by a search system.

17. A computer-readable storage medium for storing computer-readable instructions, the computer-readable instructions, when executed by one or more hardware processors, performing a method that comprises:

receiving an input item that includes one or more input item terms;

determining that a particular input item term matches a particular reference term in a particular ontology, the particular reference term corresponding to a particular entity mention, the particular ontology being a dictionary resource, provided in a dictionary resource data store, that identifies a set of entities pertaining to a prescribed subject matter domain and a particular entity, said determining identifying the particular entity mention by searching the dictionary resource;

after searching the dictionary resource, forming an input sequence that includes a set of words preceding the particular entity mention and a set of words following the particular entity mention; and applying a machine-trained model that has been trained to generate a score for the particular entity mention by using parameter values of the machine-trained model to map the input sequence into the score, the score reflecting a probability that the particular input item term is a correct match for the particular reference term in the particular ontology, wherein the machine-trained model is produced in a training phase prior to said determining, said forming, and said applying, the training phase involving:

generating a set of initial training examples by matching corpus terms in a text corpus with reference terms specified in one or more ontologies;

removing noise in the set of initial training examples by discounting initial training examples based on one or more filtering rules stored in a rules data store, to produce a set of filtered training examples; and producing the machine-trained model using a computer-implemented machine-learning process by iteratively generating the parameter values, based, in part, on the set of filtered training examples.

18. The computer-readable storage medium of claim 17, wherein the machine-trained model is one of a plurality of separately-trained machine-trained models that operate as respective independent binary classifiers, each of the plurality of machine-trained models being dedicated to a corresponding ontology and a corresponding entity type, and wherein the method further includes independently performing said determining and applying for each of the plurality of machine-trained models to generate a plurality of ontology-specific scores.

19. The computer-readable storage medium of claim 17, wherein the machine-trained model identifies a specific ontology, among a plurality of ontologies, having an entry that is most likely to match the particular input item term.

20. The computer-readable storage medium of claim 17, wherein the particular reference term is associated with a particular entity identifier that uniquely identifies an entity to which the particular reference term corresponds, and wherein the method further includes using the particular entity identifier to identify a content item that is also associated with the particular entity identifier.

* * * * *